(12) United States Patent
Jang et al.

(10) Patent No.: US 8,749,743 B2
(45) Date of Patent: Jun. 10, 2014

(54) CHOLESTERIC LIQUID CRYSTAL DISPLAY DEVICES AND METHODS OF MANUFACTURING THE SAME

(75) Inventors: Jae-eun Jang, Seoul (KR); Jae-eun Jung, Seoul (KR); Kyu-young Hwang, Seoul (KR); Jae-hoon Kim, Seoul (KR); Kwang-soo Bae, Seoul (KR)

(73) Assignees: Samsung Electronics Co., Ltd., Gyeonggi-do (KR); Industry-University Cooperation Foundation Hanyang University, Seoul (KR)

( * ) Notice: Subject to any disclaimer, the term of this patent is extended or adjusted under 35 U.S.C. 154(b) by 372 days.

(21) Appl. No.: 13/166,330

(22) Filed: Jun. 22, 2011

(65) Prior Publication Data

US 2012/0081644 A1    Apr. 5, 2012

(30) Foreign Application Priority Data

Oct. 5, 2010  (KR) .......................... 10-2010-0096918

(51) Int. Cl.
*G02F 1/1343* (2006.01)
*C09K 19/02* (2006.01)
*G02F 1/13* (2006.01)

(52) U.S. Cl.
USPC .............. 349/139; 349/176; 349/187

(58) Field of Classification Search
None
See application file for complete search history.

(56) References Cited

U.S. PATENT DOCUMENTS

| | | | |
|---|---|---|---|
| 6,618,103 B2 | 9/2003 | Hisamitsu et al. | |
| 7,563,389 B2 * | 7/2009 | Shukla et al. | 252/299.01 |
| 8,300,183 B2 * | 10/2012 | Ma | 349/98 |
| 2002/0008837 A1 | 1/2002 | Hisamitsu et al. | |
| 2004/0031672 A1 | 2/2004 | Wen | |

FOREIGN PATENT DOCUMENTS

| | | |
|---|---|---|
| GB | 2314167 A | 12/1997 |
| JP | 2003131027 A | 5/2003 |
| KR | 20020026364 | 4/2002 |

* cited by examiner

*Primary Examiner* — Sarah Hahm
(74) *Attorney, Agent, or Firm* — Harness, Dickey & Pierce, P.L.C.

(57) ABSTRACT

In a method of manufacturing a single-layer cholesteric liquid crystal display device, a liquid crystal composition of a cholesteric phase is formed between a first substrate and a second substrate. A plurality of liquid crystal layers are formed by sequentially adjusting the temperature of the cholesteric phase liquid crystal composition and performing a plurality of optical curing processes on the cholesteric phase liquid crystal composition. Each of the plurality of liquid crystal layers corresponds to one of the plurality of subpixels.

33 Claims, 13 Drawing Sheets

CHOLESTERIC LIQUID CRYSTAL DISPLAY DEVICES AND METHODS OF MANUFACTURING THE SAME

CROSS-REFERENCE TO RELATED APPLICATION(S)

This non-provisional U.S. patent application claims priority under 35 U.S.C. §119 to Korean Patent Application No. 10-2010-0096918, filed on Oct. 5, 2010, in the Korean Intellectual Property Office, the entire contents of which is incorporated herein by reference.

BACKGROUND

1. Field

Example embodiments relate to liquid crystal display devices, for example, cholesteric liquid crystal display devices, and methods of manufacturing the same.

2. Description of the Related Art

As flexible displays such as electronic paper (e-paper) are actively developed, display devices using cholesteric liquid crystals are receiving more attention.

A cholesteric liquid crystal is a liquid crystal composition formed by twisting liquid crystal molecules of a nematic liquid crystal into a helix structure. A cholesteric liquid crystal has light reflection and transmission properties which vary according to a helix pitch. For example, light having a given, desired or predetermined wavelength range is selectively reflected according to a helix pitch of twisted liquid crystal molecules. Cholesteric liquid crystals can produce a full-color image by controlling a wavelength reflection band by using pixels having different helix pitches. A cholesteric liquid crystal display device having these display characteristics has relatively clear color display characteristics, relatively high contrast characteristics, and relatively high resolution characteristics. Moreover, a display device using cholesteric liquid crystals shows relatively high performance.

Conventionally, full-color images are produced using single layer or multilayer cholesteric liquid crystal displays. In a single layer cholesteric liquid crystal display device, the red (R), the green (G), and the blue (B) pixels are arranged in the same plane. By contrast, in a multilayer cholesteric liquid crystal display, a red (R) pixel, a blue (B) pixel and a green (G) pixel are stacked on each other.

In both single layer and multilayer cholesteric liquid crystal displays, the red (R) pixel has a helix pitch that is controlled such that light having a red wavelength range is selectively reflected, the green (G) pixel has a helix pitch that is controlled such that light having a green wavelength range is selectively reflected, and the blue (B) pixel has a helix pitch that is controlled such that light having a blue wavelength range is selectively reflected.

In a multilayer cholesteric liquid crystal display, respective pixels are controlled to be in a selective reflection mode or transmission mode according to the application of a voltage, and a color corresponding to a pixel in the wavelength selection reflection mode is displayed. However, multilayer cholesteric liquid crystal displays are relatively complicated and relatively expensive to manufacture because a multilayer substrate is used. In addition, the multilayer cholesteric liquid crystal displays also provide relatively low color purity due to a scattering phenomenon, which may occur in a pixel that is in the transmission mode.

SUMMARY

Example embodiments provide single-layer cholesteric liquid crystal display devices having improved color image quality and methods of manufacturing the same.

Additional aspects will be set forth in part in the description which follows and, in part, will be apparent from the description, or may be learned by practice of the example embodiments.

At least one example embodiment provides a method of manufacturing a cholesteric liquid crystal display device having a plurality of pixel units, each including a plurality of subpixels. According to at least this example embodiment, the method includes: preparing a first substrate and a second substrate; forming a cholesteric phase liquid crystal composition, including liquid crystal molecules, an optically polymerizable polymer, and a chiral dopant, between the first substrate and the second substrate; and forming different color liquid crystal layers corresponding to the plurality of subpixels by sequentially performing a plurality of optical curing processes according to a variation in temperature of the liquid crystal composition. At least one of the liquid crystal layers is formed by applying a voltage to the liquid crystal composition during the plurality of optical curing processes.

At least one other example embodiment provides a method of manufacturing a pixel unit of a cholesteric liquid crystal display device. The pixel unit includes a plurality of subpixels. According to at least this example embodiment, the method includes: forming a cholesteric phase liquid crystal composition between a first substrate and a second substrate; and forming a plurality of liquid crystal layers between the first substrate and the second substrate by sequentially adjusting a temperature of the cholesteric phase liquid crystal composition and performing a plurality of optical curing processes on the cholesteric phase liquid crystal composition, each of the plurality of liquid crystal layers corresponding to one of the plurality of subpixels. A voltage is applied to the cholesteric phase liquid crystal composition when forming at least one of the plurality of liquid crystal layers.

According to at least some example embodiments, each of the liquid crystal layers may be formed by adjusting a pitch of the cholesteric phase liquid crystal composition by at least one of adjusting the temperature of the cholesteric phase liquid crystal composition and applying the voltage to the cholesteric phase liquid crystal composition. The voltage may be applied to the cholesteric phase liquid crystal composition when forming the liquid crystal layer having the shortest wavelength reflection band.

The liquid crystal layers may be sequentially formed from longer wavelength reflection bands to shorter wavelength reflection bands by sequentially increasing the temperature of the cholesteric phase liquid crystal composition and performing the plurality of optical curing processes.

Alternatively, the liquid crystal layers may be sequentially formed from shorter wavelength reflection bands to longer wavelength reflection bands by sequentially reducing the temperature of the liquid crystal composition and performing the plurality of optical curing processes.

The liquid crystal layers may include red, green, and blue liquid crystal layers. Alternatively, the liquid crystal layers may include cyan, magenta, and yellow liquid crystal layers.

A plurality of first electrodes may be formed on the first substrate, and a plurality of second electrodes may be formed on the second substrate. The plurality of first electrodes may be formed to correspond to the liquid crystal layers, and the plurality of second electrodes may be formed integrally as a common electrode.

Alternatively, the plurality of first electrodes and the plurality of second electrodes may be stripe-shaped across each other.

At least one other example embodiment provides a method of manufacturing a cholesteric liquid crystal display device. The cholesteric liquid crystal display device includes a plurality of pixel units, and each pixel unit includes a plurality of subpixels. According to at least this example embodiment, the method includes: preparing a first substrate and a second substrate; forming different color filter layers corresponding to the plurality of subpixels on the second substrate; forming a cholesteric phase liquid crystal composition including liquid crystal molecules, an optically polymerizable polymer, and a chiral dopant between the first substrate and the second substrate; and forming different color liquid crystal layers corresponding to the color filter layers by sequentially performing a plurality of optical curing processes according to a variation in the temperature of the cholesteric phase liquid crystal composition. At least one of the liquid crystal layers is formed by applying a voltage to the cholesteric phase liquid crystal composition during the plurality of optical curing processes.

At least one other example embodiment provides a method of manufacturing a pixel unit of a cholesteric liquid crystal display device. The pixel unit includes a plurality of subpixels. According to at least this example embodiment, the method includes: preparing a first and a second substrate; forming a color filter layer corresponding to each of the plurality of subpixels on the second substrate; forming a cholesteric phase liquid crystal composition between the first substrate and the second substrate; and forming a plurality of liquid crystal layers between the first substrate and the second substrate by sequentially adjusting a temperature of the cholesteric phase liquid crystal composition and performing a plurality of optical curing processes on the cholesteric phase liquid crystal composition, each of the plurality of liquid crystal layers corresponding to one of the plurality of subpixels. A voltage is applied to the cholesteric phase liquid crystal composition when forming at least one of the plurality of liquid crystal layers, and each color filter layer corresponds to a different color.

At least one other example embodiment provides a cholesteric liquid crystal display device including a plurality of pixel units. Each of the plurality of pixel units includes a plurality of subpixels. According to at least this example embodiment, the cholesteric liquid crystal display device includes: a first substrate and a second substrate spaced apart from each other; a plurality of different color filter layers corresponding to the plurality of subpixels formed on the second substrate; and a cholesteric liquid crystal layer disposed between the first substrate and the second substrate, and including a plurality of different micro-liquid crystal layers corresponding to each of the plurality of subpixels.

At least one other example embodiment provides a pixel unit of a cholesteric liquid crystal display device. The pixel unit includes a plurality of subpixels and comprises: a first substrate and a second substrate spaced apart from each other; a plurality of color filter layers formed on the second substrate, each of the plurality of color filter layers corresponding to a different color and corresponding to one of the plurality of subpixels; and a cholesteric phase liquid crystal layer disposed between the first substrate and the second substrate. The cholesteric phase liquid crystal layer includes a plurality of different color micro-liquid crystal layers corresponding to each of the plurality of subpixels.

According to at least some example embodiments, the color filter layers may include red, green, and blue color filter layers, and the plurality of different color micro-liquid crystal layers may include red, green, and blue micro-liquid crystal layers. Alternatively, the color filter layers may include cyan, magenta, and yellow color filter layers, and the plurality of different color micro-liquid crystal layers may include cyan, magenta, and yellow micro-liquid crystal layers.

At least one other example embodiment provides a method of manufacturing a cholesteric liquid crystal display device including a plurality of pixel units. Each of the plurality of pixel units includes a plurality of subpixels. According to at least this example embodiment, the method includes: preparing a first substrate and a second substrate; forming a plurality of different color filter layers corresponding to the plurality of subpixels on the second substrate; forming a cholesteric phase liquid crystal composition including liquid crystal molecules, an optically polymerizable polymer, and a chiral dopant between the first substrate and the second substrate; and forming a plurality of different color micro-liquid crystal layers corresponding to each of the plurality of subpixels by sequentially performing a plurality of optical curing processes according to a variation in temperature of the cholesteric phase liquid crystal composition.

At least one other example embodiment provides a method of manufacturing a pixel unit of a cholesteric liquid crystal display device. The pixel unit includes a plurality of subpixels. According to at least this example embodiment, the method comprises: preparing a first and a second substrate; forming a plurality of different color filter layers on the second substrate, each different color filter layer corresponding to one of the plurality of subpixels; forming a cholesteric phase liquid crystal composition between the first substrate and the second substrate; and forming a plurality of different color micro-liquid crystal layers corresponding to each of the plurality of subpixels by sequentially adjusting a temperature of the cholesteric phase liquid crystal composition and sequentially performing a plurality of optical curing processes.

According to at least some example embodiments, at least one of the micro-liquid crystal layers may be formed by applying a voltage to the cholesteric phase liquid crystal composition.

BRIEF DESCRIPTION OF THE DRAWINGS

Example embodiments will become apparent and more readily appreciated from the following description of the accompanying drawings in which.

DETAILED DESCRIPTION

Figure 1:
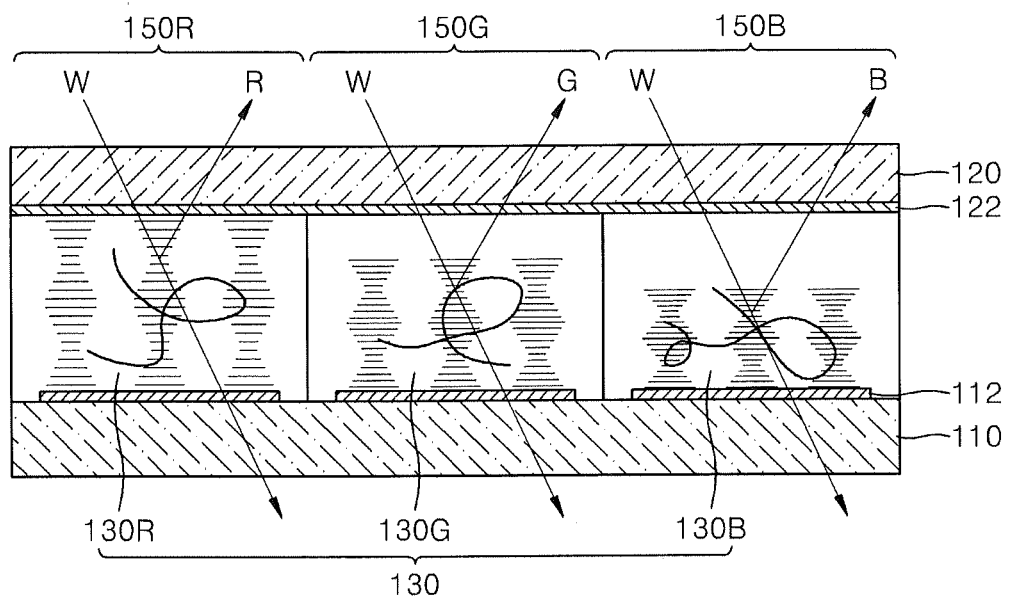
FIG. 1 is a cross-sectional view of a single-layer cholesteric liquid crystal display device according to an example embodiment.

Example embodiments will now be described more fully with reference to the accompanying drawings, in which some example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 2:
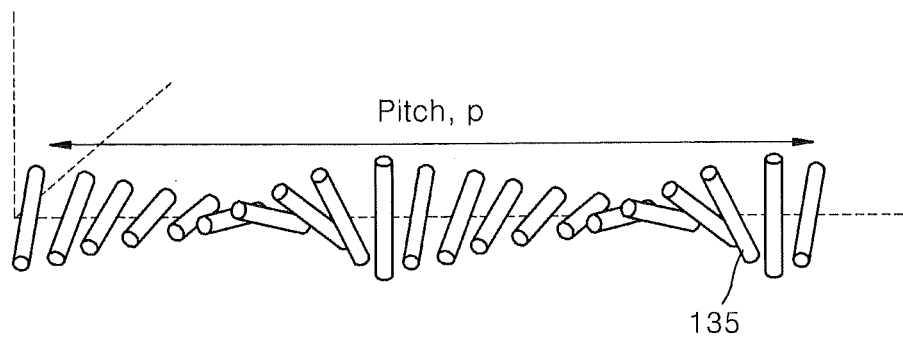
FIG. 2 illustrates a structure of a cholesteric liquid crystal polymer included in a cholesteric liquid crystal layer of FIG. 1.

FIG. 1 is a cross-sectional view of a single-layer cholesteric liquid crystal display device according to an example embodiment. FIG. 2 illustrates a structure of a cholesteric liquid crystal polymer included in a cholesteric liquid crystal layer 130 of FIG. 1.

Referring to FIG. 1, the single-layer cholesteric liquid crystal display device includes a plurality of pixel units. Each pixel unit includes a red subpixel 150R, a green subpixel 150G, and a blue subpixel 150B. The red subpixel 150R, the green subpixel 150G and blue subpixel 150B of the single-layer cholesteric liquid crystal display device are arranged in the same or substantially the same plane.

The red, green, and blue subpixels shown in FIG. 1 are only examples. In alternative example embodiments, each pixel unit may include cyan, magenta, and yellow subpixels, or various other colors of subpixels.

Still referring to FIG. 1, a first lower substrate 110 and a second upper substrate 120 are spaced apart from each other. A cholesteric liquid crystal layer 130 is disposed between the first substrate 110 and the second substrate 120. The first substrate 110 and the second substrate 120 may be formed of a transparent material such as glass, a plastic material or the like. However, example embodiments are not limited thereto.

A plurality of first electrodes 112 are formed on an upper surface of the first substrate 110, and a plurality of second electrodes 122 are formed on a lower surface of the second substrate 120. The first electrodes 112 and the second electrodes 122 may be formed of a transparent conductive material such as indium-tin-oxide (ITO) or the like.

If the single-layer cholesteric liquid crystal display device is an active matrix (AM) display device, the first electrodes 112 may be formed to correspond to the red subpixels 150R, the green subpixels 150G, and the blue subpixels 150B, whereas the second electrodes 122 may be formed integrally as a common electrode. In this example, a thin film transistor (TFT) may be connected to each of the first electrodes 112.

If the single-layer cholesteric liquid crystal display device is a passive matrix (PM) display device, the first electrodes 112 may be stripe-shaped and parallel or substantially parallel with each other. The second electrodes 122 may be parallel or substantially parallel with each other and may cross the first electrodes 112.

Referring to FIGS. 1 and 2, the cholesteric liquid crystal layer 130 includes liquid crystal molecules 135 (shown in FIG. 2), a chiral dopant, and an optically polymerizable polymer. The chiral dopant is mixed with the liquid crystal molecules to form a cholesteric phase liquid crystal polymer. The optically polymerizable polymer is cured to fix a helix pitch of the cholesteric phase. The solubility of the chiral dopant may vary with respect to the liquid crystal molecules 135 according to temperature.

The liquid crystal molecules 135 are mixed with the chiral dopant to form a cholesteric liquid crystal polymer having a cholesteric phase that is twisted into a helix structure.

As illustrated in FIG. 2, the cholesteric liquid crystal polymer is periodically twisted. The repetition length is referred to as the pitch p. Incident light is selectively reflected according to the repeated structure. A wavelength reflection band of the cholesteric liquid crystal polymer depends on the pitch p.

A wavelength λ corresponding to the maximum reflection is determined using Equation (1) shown below.

$$\lambda = n \cdot p \qquad (1)$$

In Equation (1), n is an average refractive index of the cholesteric liquid crystal polymer and p is the pitch. The pitch p depends on the amount of chiral dopant. In general, the higher the amount of chiral dopant, the shorter the pitch p. The shorter the pitch p, the lower the wavelength reflection band.

As the temperature of the cholesteric liquid crystal polymer increases, the solubility of the chiral dopant relative to the liquid crystal molecules 135 increases. If more chiral dopant is dissolved due to an increase in temperature, the helix pitch of the cholesteric phase decreases, and thus, the wavelength reflection band is lowered.

On the other hand, if the temperature of the cholesteric liquid crystal polymer is decreased and a portion of the dissolved chiral dopant is precipitated, the amount of dissolved chiral dopant decreases. In this case, the helix pitch of the cholesteric phase increases, and the wavelength reflection band is raised.

Based on the principles described above, the cholesteric liquid crystal layer 130 includes liquid crystal layers of different colors including cholesteric liquid crystal polymers having different helix pitches to produce different colors. For example, the cholesteric liquid crystal layer 130 shown in FIG. 1 includes red, green, and blue liquid crystal layers 130R, 130G, and 130B corresponding to the red, green, and blue subpixels 150R, 150G, and 150B, respectively. The red liquid crystal layer 130R selectively reflects red light R, the green liquid crystal layer 130G selectively reflects green light G, and the blue liquid crystal layer 130B selectively reflects blue light B.

Although not shown in FIG. 1, in alternative example embodiments, the cholesteric liquid crystal layer 130 may include cyan, magenta, yellow or other various colors of liquid crystal layers.

Although not shown, a spacer for maintaining a constant gap between the first substrate 110 and the second substrate 120 may be further disposed between the first substrate 110 and the second substrate 120. A light absorption layer (not shown) may also be disposed on the first substrate 110. The light absorption layer absorbs light that passes through the cholesteric liquid crystal layer 130, thereby increasing color purity.

In the single-layer cholesteric liquid crystal display device of FIG. 1, if no voltage is applied to the first and second electrodes 112 and 122 corresponding to the red subpixel 150R, the red liquid crystal layer 130R selectively reflects red light R from among incident light (e.g., white light) W.

If a given, desired or predetermined voltage is applied to the first electrodes 112 and the second electrodes 122 corresponding to the red subpixel 150R, liquid crystal molecules of the red liquid crystal layer 130R are arranged in parallel or substantially parallel with each other in an electric field. In this case, the incident white light W passes through the red liquid crystal layer 130R.

Similarly, if no voltage is applied to the first electrodes 112 and the second electrodes 122 corresponding to the green subpixel 150G, the green liquid crystal layer 130G selectively reflects green light G from among incident white light W.

If a given, desired or predetermined voltage is applied to the first electrodes 112 and the second electrodes 122 corresponding to the green subpixel 150G, liquid crystal molecules of the green liquid crystal layer 130G are arranged in parallel or substantially parallel with each other in an electric field. In this case, the incident white light W passes through the green liquid crystal layer 130G.

If no voltage is applied to the first electrodes 112 and the second electrodes 122 corresponding to the blue subpixel 150B, the blue liquid crystal layer 130B selectively reflects blue light B from among the incident white light W.

If a given, desired or predetermined voltage is applied to the first electrodes 112 and the second electrodes 122 corresponding to the blue subpixel 150B, liquid crystal molecules of the blue liquid crystal layer 130B are arranged in parallel or substantially parallel with each other in an electric field. In this case, the incident white light W passes through the blue liquid crystal layer 130B.

By selectively applying voltages to the first electrodes 112 and the second electrodes 122 corresponding to the red, green, and blue subpixels 150R, 150G, and 150B, a desired color image may be realized. The example embodiment in FIG. 1 shows that the red, green, and blue liquid crystal layers 130R, 130G, and 130B reflect the red light R, the green light G, and the blue light B, respectively.

Hereinafter, an example embodiment of a method of manufacturing a cholesteric liquid crystal display device will be described in more detail. FIGS. 3 through 10 are views for explaining an example embodiment of a method of manufacturing a cholesteric liquid crystal display device.

Figure 3:
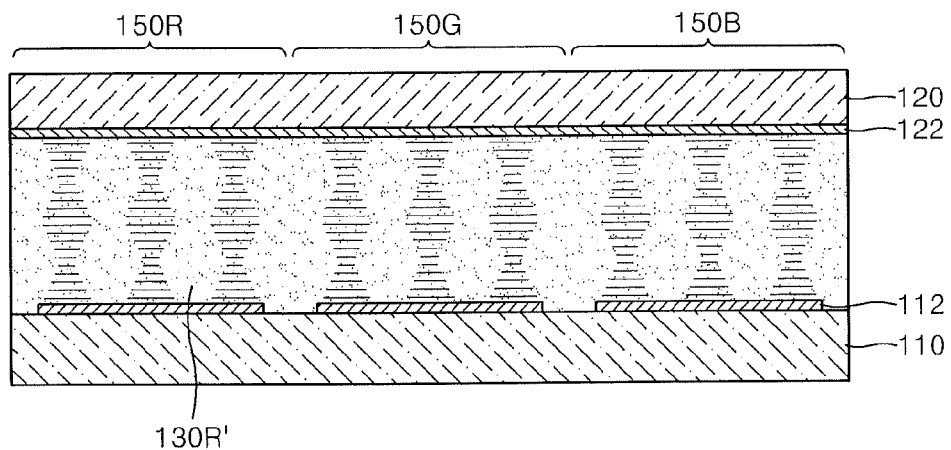
FIGS. 3 through 10 are views illustrating a method of manufacturing a cholesteric liquid crystal display device according to an example embodiment.

Referring to FIG. 3, a first substrate 110 and a second substrate 120 are prepared. In FIG. 3, the first substrate 110 is a lower substrate and the second substrate 120 is an upper substrate. The first substrate 110 and the second substrate 120 are spaced apart from one another. Although not shown in FIG. 3, a spacer may be disposed between the first substrate 110 and the second substrate 120 to maintain a constant or substantially constant gap between the first substrate 110 and the second substrate 120.

According to at least some example embodiments, the first substrate 110 and the second substrate 120 may be transparent substrates formed of, for example, glass, a plastic material or the like. However, example embodiments are not limited thereto.

The first electrodes 112 are formed on the upper surface of the first substrate 110, whereas the second electrodes 122 are formed on the lower surface of the second substrate 120. The first electrodes 112 and the second electrodes 122 may be formed of a transparent conductive material such as ITO or the like.

If the cholesteric liquid crystal display device is an AM display device, each first electrode 112 may be formed to correspond to one of the red, green, and blue subpixels 150R, 150G, and 150B, whereas the second electrodes 122 are formed integrally as a common electrode. In this example, a TFT may be connected to each of the first electrodes 112.

Alternatively, if the cholesteric liquid crystal display device is a PM display device, the first electrodes 112 may be stripe-shaped and in parallel or substantially parallel with one another, whereas the second electrodes 122 may be arranged in parallel or substantially parallel with one another across the first electrodes 112.

A cholesteric liquid crystal composition (not shown) is injected between the first substrate 110 and the second substrate 120. In one example, the cholesteric liquid crystal composition may be formed by dissolving a chiral dopant in a mixed solution containing an optically polymerizable polymer and liquid crystal molecules. The optically polymerizable polymer may be an ultraviolet (UV) ray curable polymer such as an acrylate-based polymer. However, example embodiments are not limited thereto. The chiral dopant is a mirror symmetric compound. The solubility of the chiral dopant varies with respect to liquid crystal molecules according to temperature.

As mentioned above, if a temperature of the cholesteric liquid crystal composition is changed, the solubility thereof varies with respect to liquid crystal molecules, and thus, the helix pitch of a cholesteric phase varies.

Still referring to FIG. 3, a red liquid crystal composition 130R' is formed by adjusting a temperature of the cholesteric liquid crystal composition. In more detail, the red liquid crystal composition 130R' having the helix pitch of a red light wavelength reflection band is formed by adjusting the cholesteric liquid crystal composition to a given, desired or predetermined temperature.

Figure 4:
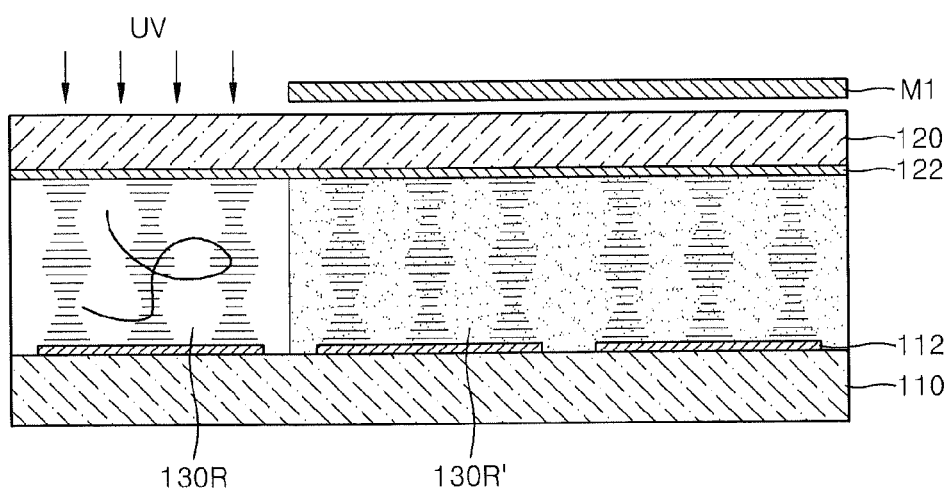

As shown in FIG. 4, a mask M1 is formed on an upper surface of the second substrate 120. The red liquid crystal composition 130R' disposed in a region corresponding to the red subpixel 150R is cured with UV rays by irradiating at least the exposed portion of the upper surface of the second substrate 120 with UV rays. Thus, an optically polymerizable polymer included in the red liquid crystal composition 130R' disposed in the region corresponding to the red subpixel 150R is cured, thereby forming the red liquid crystal layer 130R. By curing the red liquid crystal composition 130R' with UV rays, the helix pitch having the red light wavelength reflection band is fixed in the red liquid crystal layer 130R.

Figure 5:
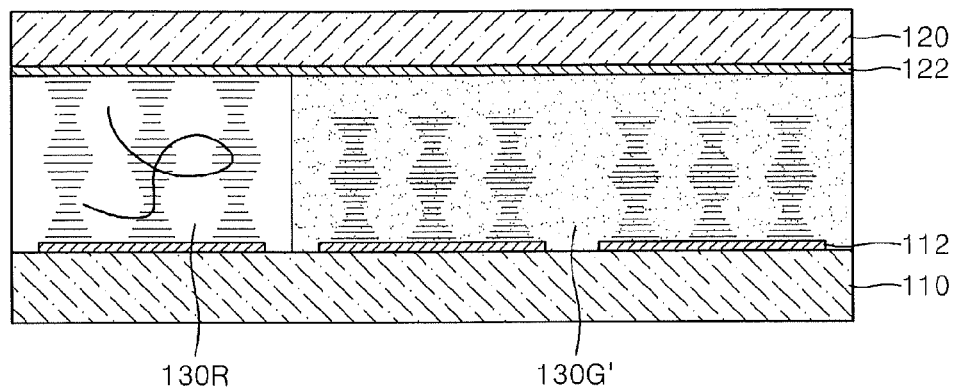

Referring to FIG. 5, a green liquid crystal composition 130G' is formed by increasing a temperature of the uncured red liquid crystal composition 130R' disposed in regions corresponding to the green subpixel 150G and the blue subpixel 150B. When the temperature of the red liquid crystal composition 130R' increases, the helix pitch of the cholesteric phase is reduced because the solubility of the chiral dopant increases with respect to liquid crystal molecules. Therefore, the green liquid crystal composition 130G' having the helix pitch of a green light wavelength reflection band is formed in the regions corresponding to the green subpixel 150G and the blue subpixel 150B by raising the temperature of the uncured red liquid crystal composition 130R' to a given, desired or predetermined level.

Figure 6:
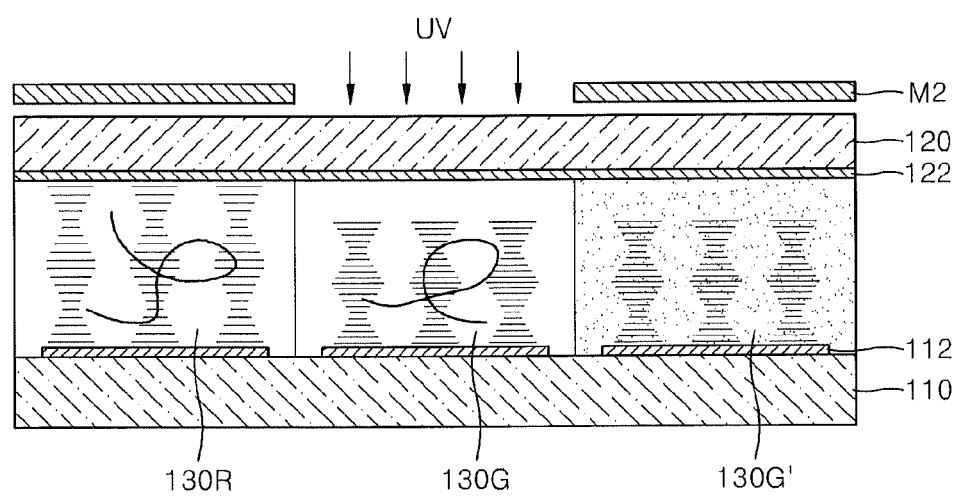

Referring to FIG. 6, a mask M2 is formed on portions of the upper surface of the second substrate 120 corresponding to the red subpixel 150R and the blue subpixel 150B. The green liquid crystal composition 130G' disposed in a region corresponding to the green subpixel 150G is cured with UV rays by irradiating at least the exposed portion of the upper surface of the second substrate 120 with UV rays. Thus, an optically polymerizable polymer included in the green liquid crystal composition 130G' disposed in the region corresponding to the green subpixel 150G is cured, thereby forming the green liquid crystal layer 130G. By curing the green liquid crystal composition 130G' with UV rays, the helix pitch having a green light wavelength reflection band is fixed in the green liquid crystal layer 130G.

Figure 9:
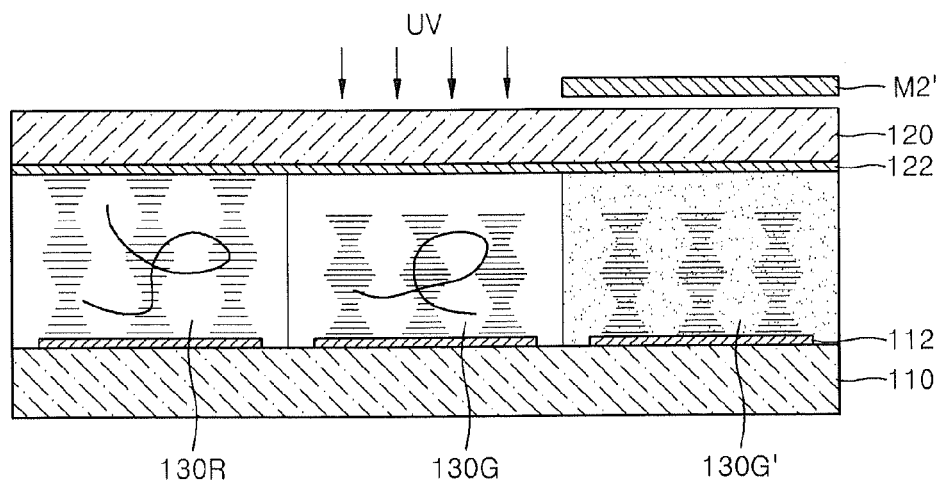

As shown in FIG. 9, in alternative example embodiments, the operation of curing the green liquid crystal composition 130G' with UV rays may be performed by using a second mask M2' that exposes the red and green subpixels 150R and 150G. In this example, the red liquid crystal layer 130R is not affected even when exposed to UV rays because the helix pitch having the red light wavelength reflection band is fixed in the red liquid crystal layer 130R formed in the red subpixel 150R.

Figure 7:
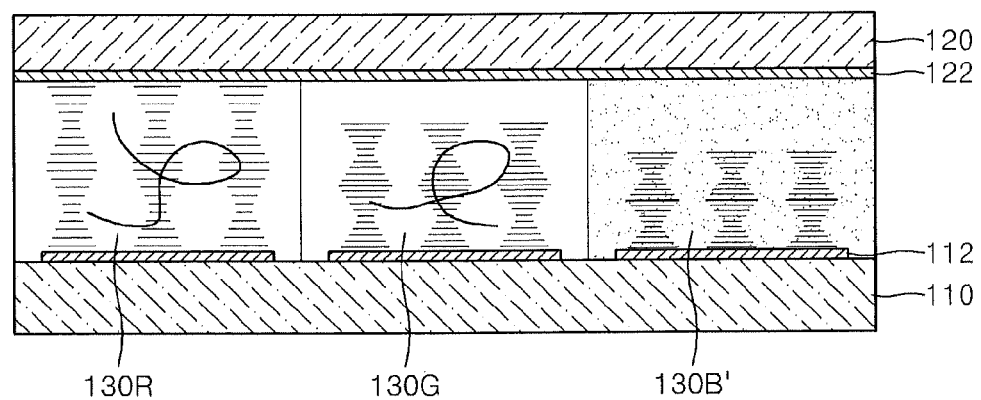

Referring to FIG. 7, a blue liquid crystal composition 130B' is formed by increasing a temperature of the uncured green liquid crystal composition 130G' disposed in the region corresponding to the blue subpixel 150B, and applying a given, desired or predetermined voltage to the uncured green liquid crystal composition 130G'. If the temperature of the green liquid crystal composition 130G' is increased, the helix pitch of the cholesteric phase decreases. The helix pitch of the cholesteric phase is further reduced in response to the voltage applied to the uncured green liquid crystal composition 130G'. By increasing the change in the helix pitch a clearer blue color may be displayed. Thus, The blue liquid crystal composition 130B' having the helix pitch of a blue light wavelength reflection band may be formed in the region corresponding to the blue subpixel 150B by increasing the temperature of the uncured green liquid crystal composition 130G' and applying the voltage to the uncured green liquid crystal composition 130G'.

Figure 8:
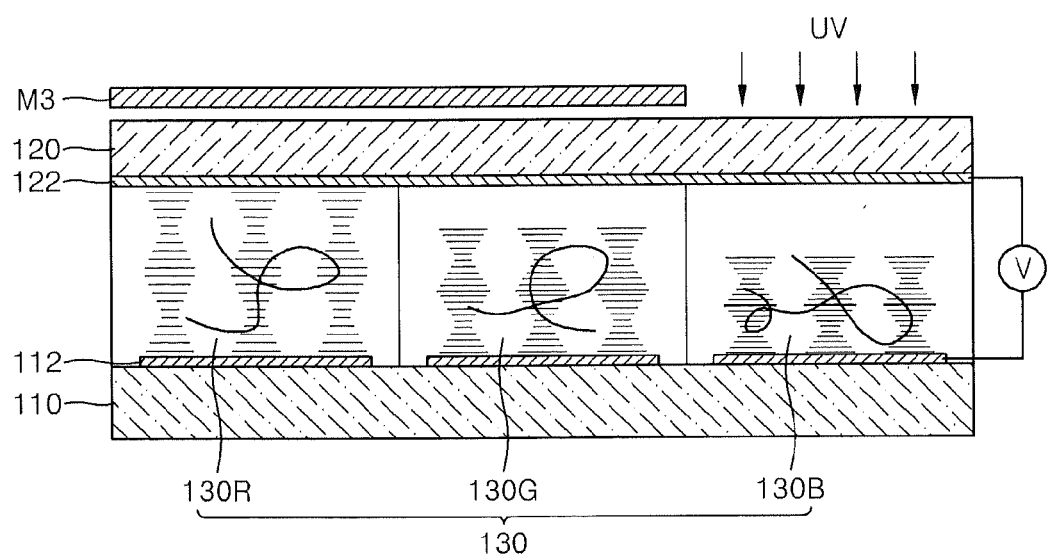

Referring to FIG. 8, a mask M3 is formed on the upper surface of the second substrate 120 to cover portions of the second substrate 120 corresponding to the red subpixel 150R and the green subpixel 150G. The blue liquid crystal composition 130B' disposed in a region corresponding to the blue subpixel 150B is cured with UV rays by irradiating at least the exposed portion of the upper surface of the second substrate 120 with UV rays. Thus, an optically polymerizable polymer included in the blue liquid crystal composition 130B' disposed in the region corresponding to the blue subpixel 150B is cured, thereby forming the blue liquid crystal layer 130B. By curing the blue liquid crystal composition 130B' with UV rays, the helix pitch having a blue light wavelength reflection band is fixed in the blue liquid crystal layer 130B.

Figure 10:
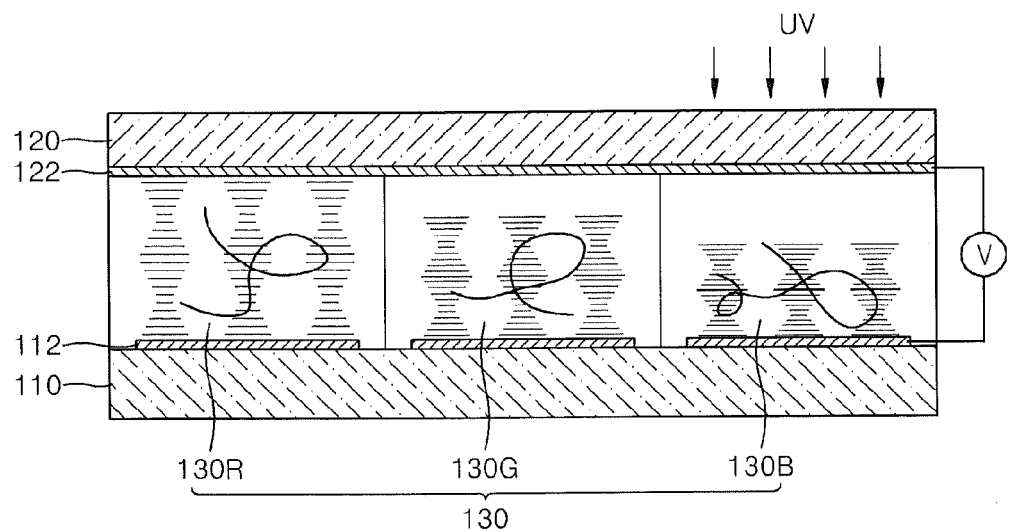

As shown in FIG. 10, in alternative example embodiments, the blue liquid crystal composition 130B' may be cured with UV rays by irradiating UV rays onto the upper portion of the second substrate 120 without a mask. In this case, because the helix pitches of the red and green light wavelength reflection bands are fixed in the red and green liquid crystal layers 130R and 130G formed in the regions corresponding to the red and green subpixels 150R and 150G, respectively, the red and green liquid crystal layers 130R and 130G are not affected even when exposed to UV rays. Thus, the cholesteric liquid crystal layer 130 including the red, green, and blue liquid crystal layers 130R, 130G, and 130B corresponding to the red, green, and blue subpixels 150R, 150G, and 150B is formed between the first substrate 110 and the second substrate 120.

According to at least the example embodiments discussed above with regard to FIGS. 3-11, the liquid crystal layers are sequentially formed from longer wavelength reflection bands to shorter wavelength reflection bands by sequentially increasing the temperature of the cholesteric liquid crystal layer 130 and performing a plurality of optical curing processes on the liquid crystal layer 130. In the example embodiments discussed above with regard to FIGS. 3-10, the red, green, and blue liquid crystal layers 130R, 130G, and 130B are formed sequentially.

As described above, when the blue liquid crystal layer 130B is formed, the temperature is increased and a voltage is applied, thereby increasing a change in the helix pitch and displaying a clearer color image. Although the voltage is applied to the blue liquid crystal layer 130B in this example embodiment, example embodiments are not limited thereto. For example, the voltage may be applied to the red liquid crystal layer 130R and/or the green liquid crystal layer 130G, thereby displaying a clearer color image.

Although each of the pixel units includes the red, green, and blue subpixels 150R, 150G, and 150B in this example embodiment, in alternative example embodiments each pixel unit may include cyan, magenta, and yellow subpixels. In this example, the cholesteric liquid crystal layer 130 may include cyan, magenta, and yellow liquid crystal layers. In other alternative embodiments, each pixel unit may include various colors of subpixels.

FIGS. 11 through 18 are views illustrating a method of manufacturing a cholesteric liquid crystal display device according to another example embodiment. Differences between the example embodiment shown in FIGS. 3 through 10 and the example embodiment shown in FIGS. 11 through 18 will be described below.

Figure 11:
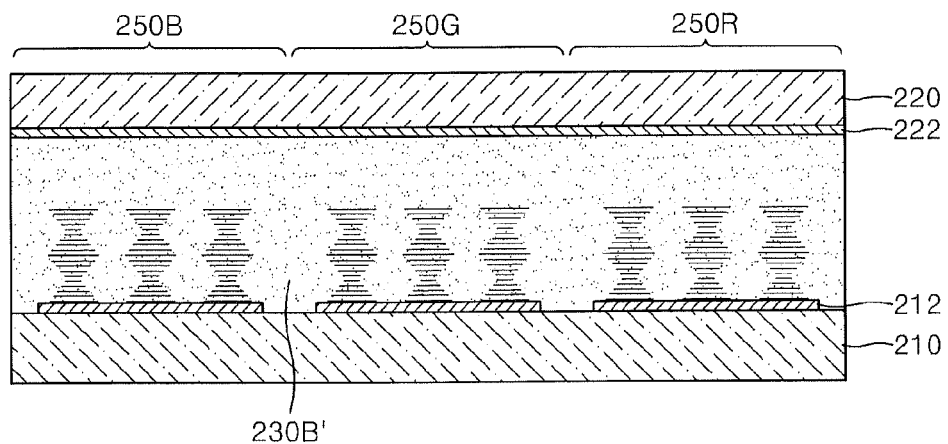
FIGS. 11 through 18 are views illustrating a method of manufacturing a cholesteric liquid crystal display device according to another example embodiment.

Referring to FIG. 11, a first substrate 210 and a second substrate 220 are prepared. In FIG. 11, the first substrate 210 is a lower substrate and the second substrate 220 is an upper substrate. The first substrate 210 and the second substrate 220 are spaced apart from one another.

A plurality of first electrodes 212 are formed on the upper surface of the first substrate 210, and a plurality of second electrodes 222 are formed on the lower surface of the second substrate 220.

If the cholesteric liquid crystal display device is an AM cholesteric liquid crystal display device, the first electrodes 212 are formed to correspond to red, green, and blue subpixels 250R, 250G, and 250B, whereas the second electrodes 222 are formed integrally as a common electrode. In this example, a TFT may be connected to each of the first electrodes 212.

If the liquid crystal display device is a PM cholesteric liquid crystal display device, the first electrodes 212 may be stripe-shaped and in parallel or substantially parallel with one another, whereas the second electrodes 222 may be parallel or substantially parallel to one another across the first electrodes 212.

Still referring to FIG. 11, a cholesteric liquid crystal composition (not shown) is injected between the first substrate 210 and the second substrate 220. The cholesteric liquid crystal composition may be formed by dissolving a chiral dopant in a mixed solution containing an optically polymerizable polymer and liquid crystal molecules.

A blue liquid crystal composition 230B' is formed by adjusting a temperature of the cholesteric liquid crystal composition and applying a given, desired or predetermined voltage to the cholesteric liquid crystal composition. More specifically, if the cholesteric liquid crystal composition is raised to a given, desired or predetermined temperature, and a given, desired or predetermined voltage is applied to the cholesteric liquid crystal composition, the blue liquid crystal composition 230B' having the helix pitch of a blue light wavelength reflection band is formed, thereby displaying a clearer blue color.

Figure 12:
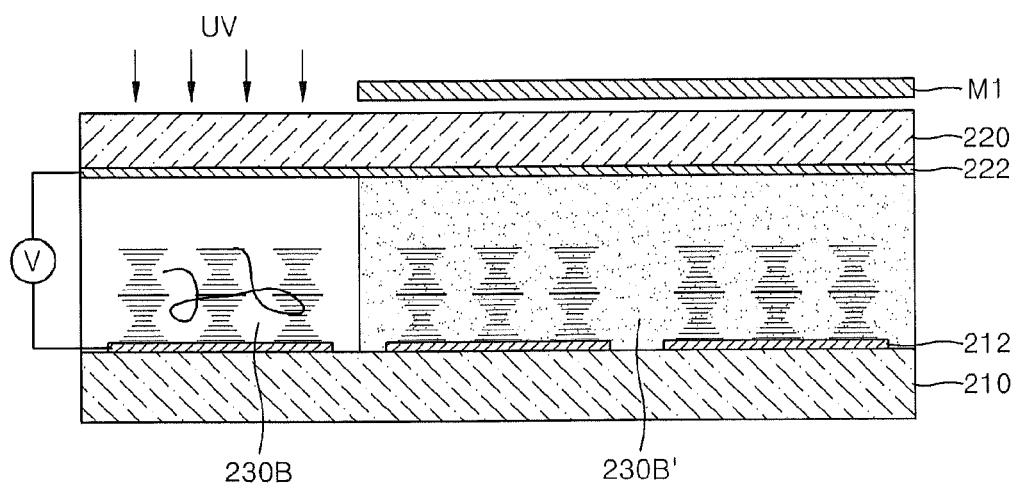

Referring to FIG. 12, a mask M1 is formed on an upper surface of the second substrate 220. The blue liquid crystal composition 230B' disposed in a region corresponding to the blue subpixel 250B is cured with UV rays by irradiating at least the exposed portion of the upper surface of the second substrate 220 with UV rays. As shown in FIG. 12, the exposed portion of the second substrate 220 corresponds to the blue subpixel 250B. Thus, an optically polymerizable polymer included in the blue liquid crystal composition 230B' disposed in the region corresponding to the blue subpixel 250B is cured to form a blue liquid crystal layer 230B. By curing the blue liquid crystal composition 230B' with UV rays, the helix pitch having the blue light wavelength reflection band is fixed in the blue liquid crystal layer 230B.

Figure 13:
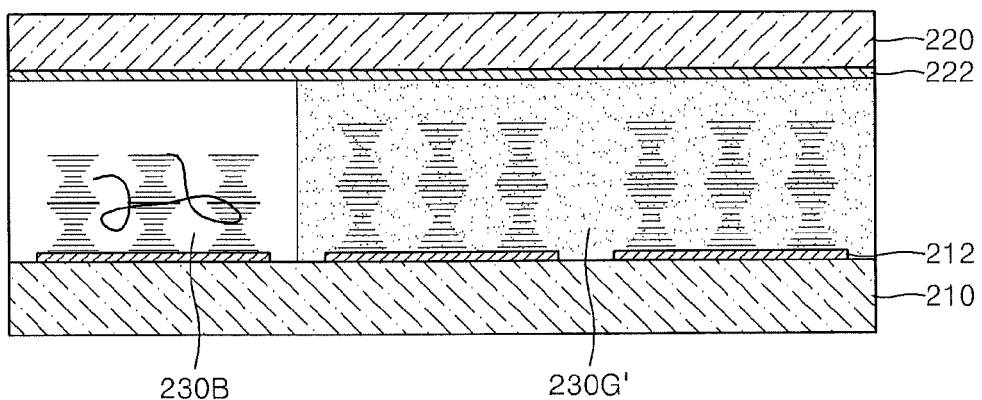

Referring to FIG. 13, a green liquid crystal composition 230G' is formed by reducing a temperature of the uncured blue liquid crystal composition 230B' disposed in regions corresponding to the green subpixel 250G and the red subpixel 250R. In this example, if the temperature of the uncured blue liquid crystal composition 230B' is reduced, the helix pitch of a cholesteric phase increases because the solubility of the chiral dopant is reduced with respect to liquid crystal molecules. Thus, by reducing the temperature of the uncured blue liquid crystal composition 230B', the green liquid crystal composition 230G' having the helix pitch of a green light wavelength reflection band is formed in the regions corresponding to the green subpixel 250G and the red subpixel 250R.

Figure 14:
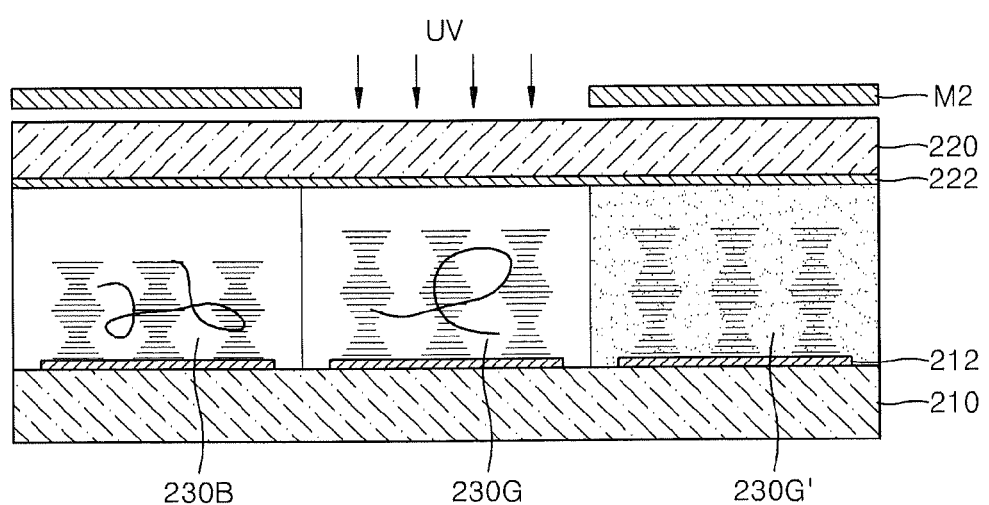

Referring to FIG. 14, a mask M2 is formed on portions of the upper surface of the second substrate 220 corresponding to the blue subpixel 250B and the red subpixel 250R. The portion of the second substrate 220 corresponding to the green subpixel 250G is exposed through the mask M2.

The green liquid crystal composition 230G' disposed in the region corresponding to the green subpixel 250G is cured with UV rays by irradiating at least the exposed portion of the second substrate 220 with UV rays. Thus, an optically polymerizable polymer included in the green liquid crystal composition 230G' disposed in the region corresponding to the green subpixel 250G is cured to form a green liquid crystal layer 230G. By curing the green liquid crystal composition 230G' with UV rays, the helix pitch having a green light wavelength reflection band is fixed in the green liquid crystal layer 230G.

Figure 17:
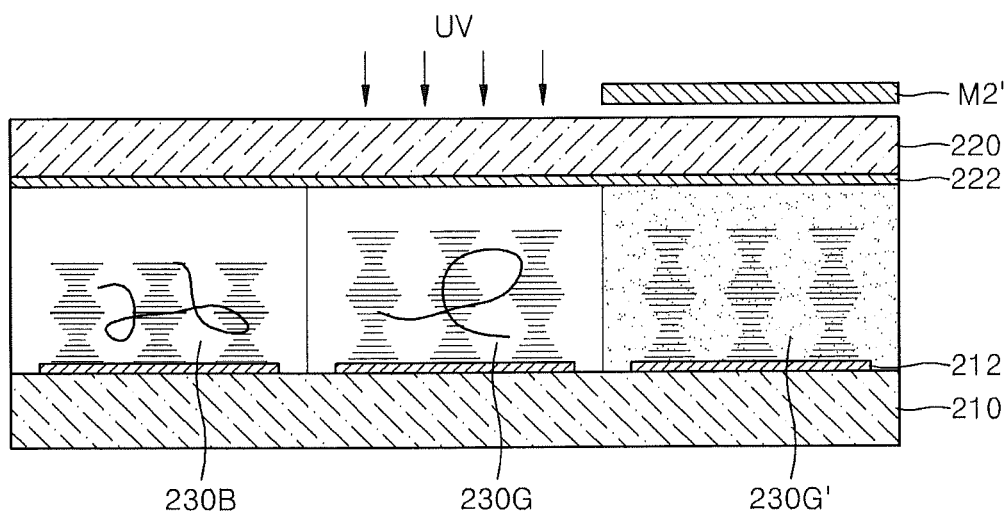

As shown in FIG. 17, in alternative example embodiments, the green liquid crystal composition 230G' may be cured by UV rays using a second mask M2', which exposes both the blue and green subpixels 250B and 250G. In this case, the blue liquid crystal layer 230B is not affected even when exposed to UV rays because the helix pitch of the blue liquid crystal layer 230B corresponding to the blue subpixel 250B is already fixed.

Figure 15:
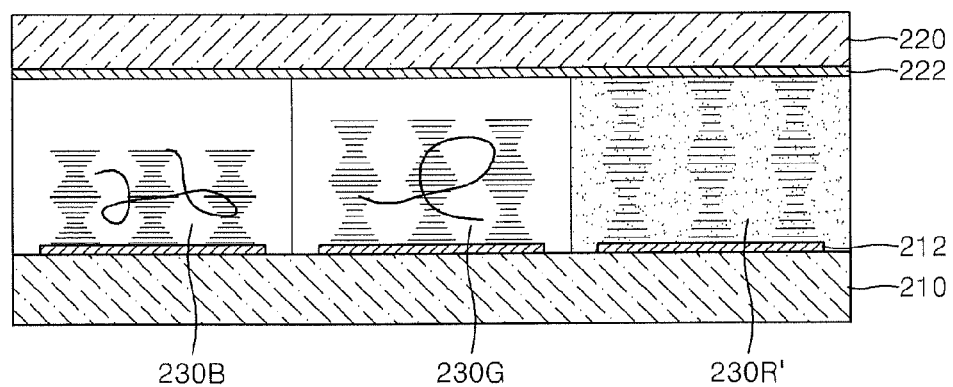

Referring to FIG. 15, a red liquid crystal composition 230R' is formed by further reducing a temperature of the uncured green liquid crystal composition 230G' disposed in the region corresponding to the red subpixel 230R. If the temperature of the uncured green liquid crystal composition 230G' is further reduced, the helix pitch of the cholesteric phase increases. By reducing the temperature of the uncured green liquid crystal composition 230G', the red liquid crystal composition 230R'having the helix pitch of a red light wavelength reflection band is formed in the region corresponding to the red subpixel 250R.

Figure 16:
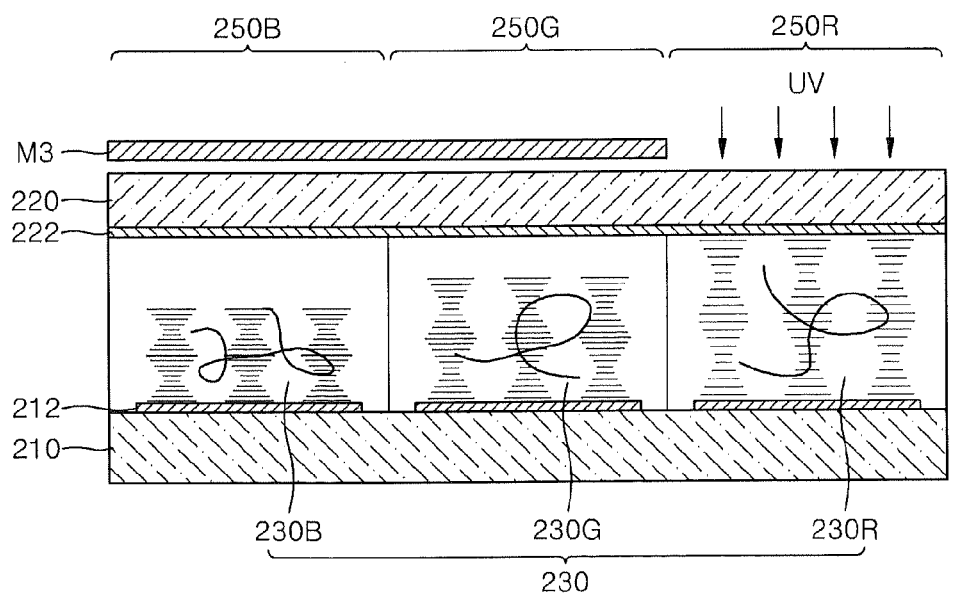

Referring to FIG. 16, a mask M3 is formed on portions of the upper surface of the second substrate 220 corresponding to the blue subpixel 250B and the green subpixel 250G. The portion of the second substrate 220 corresponding to the red subpixel 250R is exposed through the mask M3.

The red liquid crystal composition 230R' disposed in the region corresponding to the red subpixel 250R is cured with UV rays by irradiating at least the exposed portion of the second substrate 220 with UV rays. Thus, an optically polymerizable polymer included in the red liquid crystal composition 230R' disposed in the region corresponding to the red subpixel 250R is cured to form a red liquid crystal layer 230R. By curing the red liquid crystal composition 230R' with UV rays, the helix pitch having the red light wavelength reflection band is fixed in the red liquid crystal layer 230R.

Figure 18:
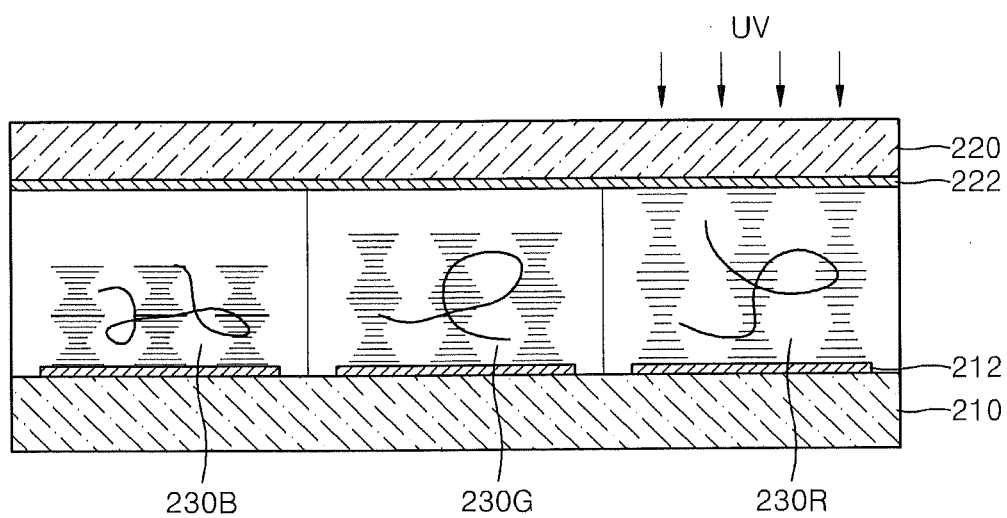

As shown in FIG. 18, in an alternative example embodiment, the red liquid crystal composition 230R' may be cured with UV rays by irradiating UV rays onto the upper portion of the second substrate 220 without a mask. In this case, the blue and green liquid crystal layers 230B and 230G are not affected even when exposed to UV rays because the helix pitches of the blue and green light wavelength reflection bands in the blue and green liquid crystal layers 230B and 230G are fixed.

By utilizing the methods described above with regard to FIGS. 11-18, a cholesteric liquid crystal layer 230 including the red, green, and blue liquid crystal layers 230R, 230G, and 230B corresponding to the red, green, and blue subpixels 250R, 250G, and 250B is formed between the first substrate 210 and the second substrate 220.

According to at least this example embodiment, the liquid crystal layers are sequentially formed from shorter wavelength reflection bands to longer wavelength reflection bands by sequentially decreasing the temperature of the liquid crystal composition 230 and performing a plurality of optical curing processes. Thus, the blue, green, and red liquid crystal layers 230B, 230G, and 230R are formed sequentially.

In addition, as described above, when the blue liquid crystal layer 230B is formed, the temperature is adjusted and a voltage is applied to increase a change in the helix pitch thereby resulting in a clearer color image.

Although the voltage is applied to the blue liquid crystal layer 230B in the example embodiment, example embodiments are not limited thereto. For example, voltage may be applied to the red liquid crystal layer 230R and/or the green liquid crystal layer 230G to display a clearer color image.

Although the pixel unit includes the red, green, and blue subpixels 250R, 250G, and 250B in this example embodiment, the pixel unit may include cyan, magenta, and yellow subpixels in other example embodiments. If so, the cholesteric liquid crystal layer 230 may include cyan, magenta, and yellow liquid crystal layers. In other alternative embodiments, the pixel unit may include various colors of subpixels.

Figure 19:
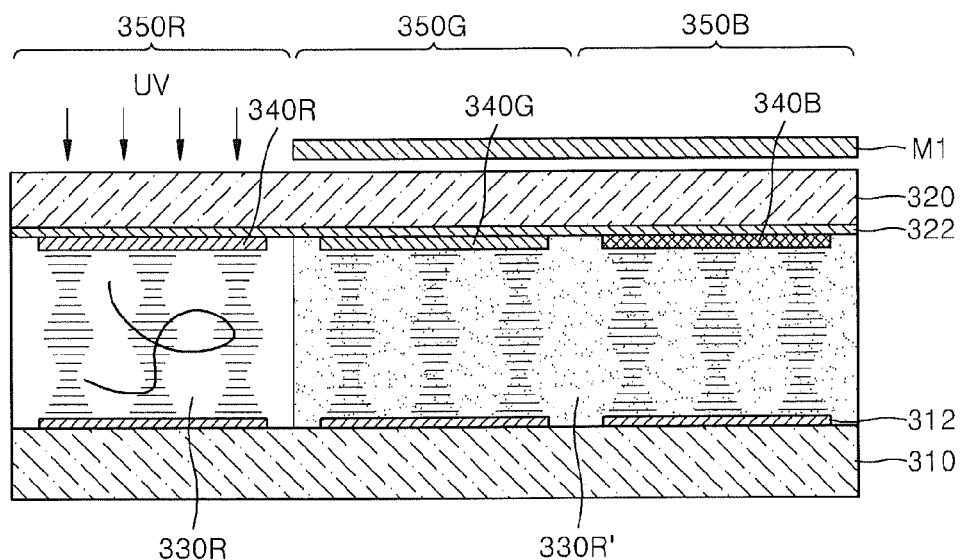
FIGS. 19 through 21 are views illustrating a method of manufacturing a cholesteric liquid crystal display device according to yet another example embodiment.
Figure 20:
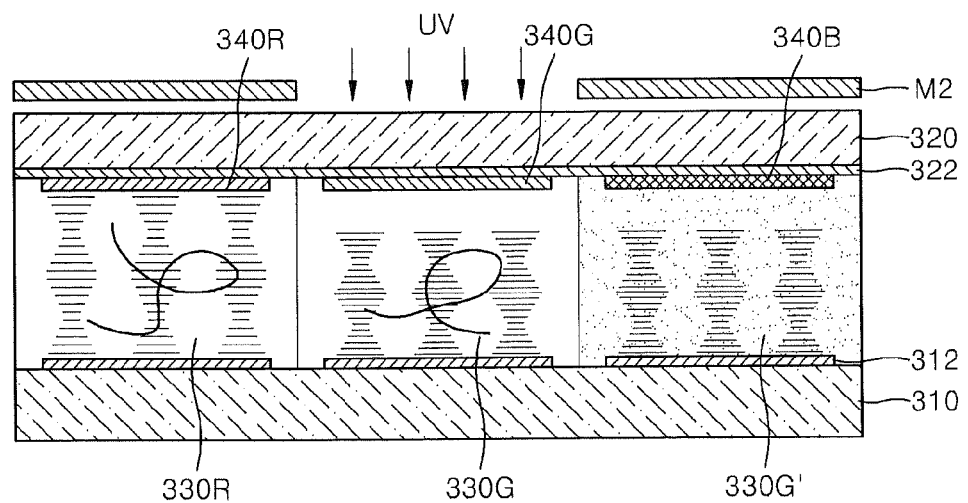
Figure 21:
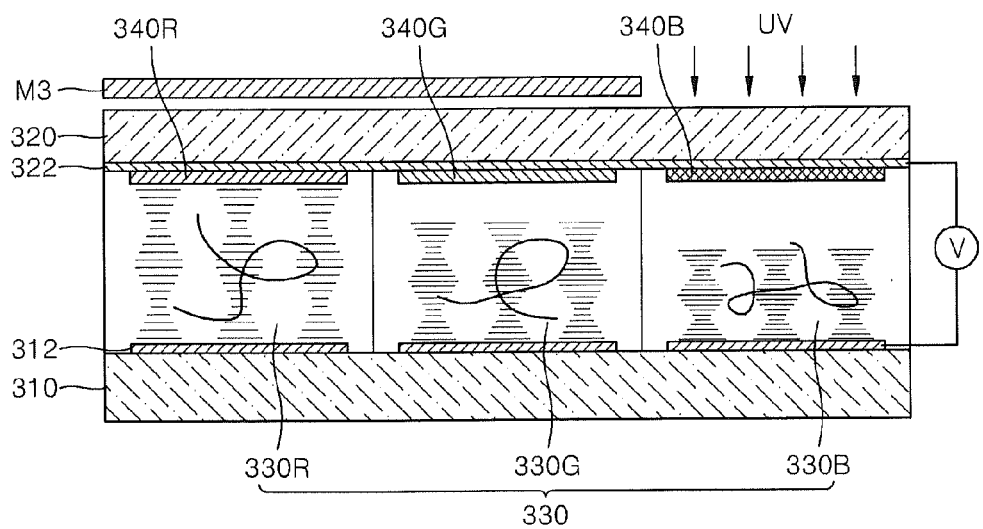

FIGS. 19 through 21 are views illustrating another example embodiment of a method of manufacturing a cholesteric liquid crystal display device. The method of manufacturing the cholesteric liquid crystal display device shown in FIGS. 19 through 21 is similar to the method of manufacturing the cholesteric liquid crystal display device described with reference to FIGS. 3 through 10, except that red, green, and blue color filter layers 340R, 340G, and 340B are disposed on a lower surface of a second (upper) substrate 320.

Referring to FIG. 19, a first substrate 310 and the second substrate 320 are spaced apart from each other. A plurality of first electrodes 312 are formed on the upper surface of the first substrate 310. A plurality of second electrodes 322 are formed on the lower surface of the second substrate 320.

A red color filter layer 340R is formed to correspond to the red subpixel 350R on a lower surface of the second electrodes 322. A green color filter layer 340G is formed to correspond to the green subpixel 350G on a lower surface of the second substrate 320. A blue color filter layer 340B is formed to correspond to the blue subpixel 350B on a lower surface of the second electrodes 322.

Still referring to FIG. 19, a cholesteric liquid crystal composition (not shown) is injected between the first substrate 310 and the second substrate 320. The cholesteric liquid crystal composition includes a mixture of liquid crystal molecules, a chiral dopant, and an optically polymerizable polymer.

A red liquid crystal composition 330R' having the helix pitch of a red light wavelength reflection band is formed by adjusting the cholesteric liquid crystal composition to a given, desired or predetermined temperature.

A mask M1 is formed on an upper surface of the second substrate 320. The mask M1 covers upper portions of the second substrate 320 corresponding to the green and blue subpixels 350G and 350B. But, the upper portion of the second substrate 320 corresponding to the red subpixel 350R is exposed.

The red liquid crystal composition 330R' disposed in a region corresponding to the red subpixel 350R is then cured with UV rays by irradiating a portion of the upper surface of the second substrate 320 exposed through the first mask M1 with UV rays. Thus, an optically polymerizable polymer included in the red liquid crystal composition 330R' disposed in the region corresponding to the red subpixel 350R is cured, thereby forming a red liquid crystal layer 330R. By curing the red liquid crystal composition 330R' with UV rays, the helix pitch having a red light wavelength reflection band is fixed in the red liquid crystal layer 330R.

Referring to FIG. 20, a mask M2 is formed on portions of the upper surface of the second substrate 320 corresponding to the blue subpixel 350B and the red subpixel 350R. The portion of the second substrate 320 corresponding to the green subpixel 350G is exposed through the mask M2.

A green liquid crystal composition 330G' is formed by increasing a temperature of the uncured red liquid crystal composition 330R' disposed in regions corresponding to the green subpixel 350G and the blue subpixel 350B. In this example, the temperature of the uncured red liquid crystal composition 330R' is increased to form a green liquid crystal composition 330G' having the helix pitch of a green light wavelength reflection band in the regions corresponding to the green subpixel 350G and the blue subpixel 350B.

The green liquid crystal composition 330G' disposed in the region corresponding to the green subpixel 350G is cured with UV rays by irradiating the exposed portion of the second substrate 320 with UV rays. Thus, an optically polymerizable polymer included in the green liquid crystal composition 330G' disposed in the region corresponding to the green subpixel 350G is cured to form a green liquid crystal layer 330G. By curing the green liquid crystal composition 330G' with UV rays, the helix pitch having a green light wavelength reflection band is fixed in the green liquid crystal layer 330G.

As described above, in alternative example embodiments, the green liquid crystal composition 330G' may be cured with UV rays using the second mask M2' (of FIG. 9) that exposes the red and green subpixels 350R and 350G.

Referring to FIG. 21, a blue liquid crystal composition (not shown) is formed by increasing a temperature of the uncured green liquid crystal composition 330G' disposed in the region corresponding to the blue subpixel 350B and applying a given, desired or predetermined voltage to the green liquid crystal composition 330G'. By increasing the temperature of the uncured green liquid crystal composition 330G' and applying a voltage to the green liquid crystal composition 330G', the helix pitch of a cholesteric phase is reduced. Thus, the blue liquid crystal composition having the helix pitch of a blue light wavelength reflection band may be formed in the region corresponding to the blue subpixel 350B by increasing the temperature of the uncured green liquid crystal composition 330G' and applying the voltage to the green liquid crystal composition 330G'.

A mask M3 is formed on portions of the upper surface of the second substrate 320 corresponding to the red subpixel 350R and the green subpixel 350G. The portion of the second substrate 320 corresponding to the blue subpixel 350B is exposed through the mask M3. The blue liquid crystal composition disposed in the region corresponding to the blue subpixel 350B is cured with UV rays by irradiating an exposed portion of the second substrate 320 with UV rays. Thus, an optically polymerizable polymer included in the blue liquid crystal composition disposed in the region corresponding to the blue subpixel 350B is cured to form a blue liquid crystal layer 330B. By curing the blue liquid crystal composition with UV rays, the helix pitch having a blue light wavelength reflection band is fixed in the blue liquid crystal layer 330B.

As described above, in alternative example embodiments, the blue liquid crystal composition may be cured with UV rays by irradiating UV rays on the upper portion of the second substrate 320 without a mask.

According to the example embodiments described above with regard to FIGS. 19-21, a cholesteric liquid crystal layer 330 including the red, green, and blue liquid crystal layers 330R, 330G, and 330B corresponding to the red, green, and blue subpixels 350R, 350G, and 350B is formed between the first substrate 310 and the second substrate 320.

According to at least these example embodiments, the liquid crystal layers are formed sequentially from longer wavelength reflection bands to shorter wavelength reflection bands by sequentially increasing the temperature of the liquid crystal composition and performing a plurality of optical curing processes. A voltage is also applied when forming at least one of the plurality of liquid crystal layers. In this example, the red, green, and blue liquid crystal layers 330R, 330G, and 330B are formed sequentially.

As described above, in this example embodiment, the red, green, and blue color filter layers 340R, 340G, and 340B are disposed on the second (upper) substrate 320, thereby displaying a clear color image having relatively high resolution and/or relatively high purity.

Although a voltage is applied to the blue liquid crystal layer 330B in this example, example embodiments are not limited thereto. In this example, the voltage may be applied to the red liquid crystal layer 330R and/or the green liquid crystal layer 330G.

Further, the example embodiments shown in FIGS. 19-21 are described with regard to a pixel unit including red, green, and blue subpixels 350R, 350G, and 350B, the pixel unit may include cyan, magenta, and yellow subpixels in other example embodiments. In this case, the cholesteric liquid crystal layer 330 may include cyan, magenta, and yellow liquid crystal layers. Alternatively, the pixel unit may include various colors of subpixels.

Figure 22:
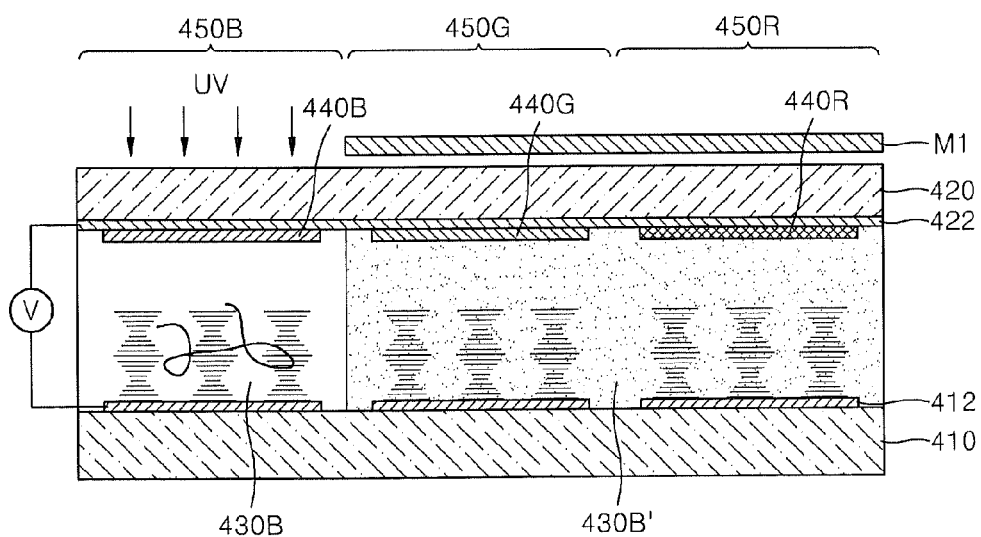
FIGS. 22 through 24 are views illustrating a method of manufacturing a cholesteric liquid crystal display device according to still another example embodiment.
Figure 23:
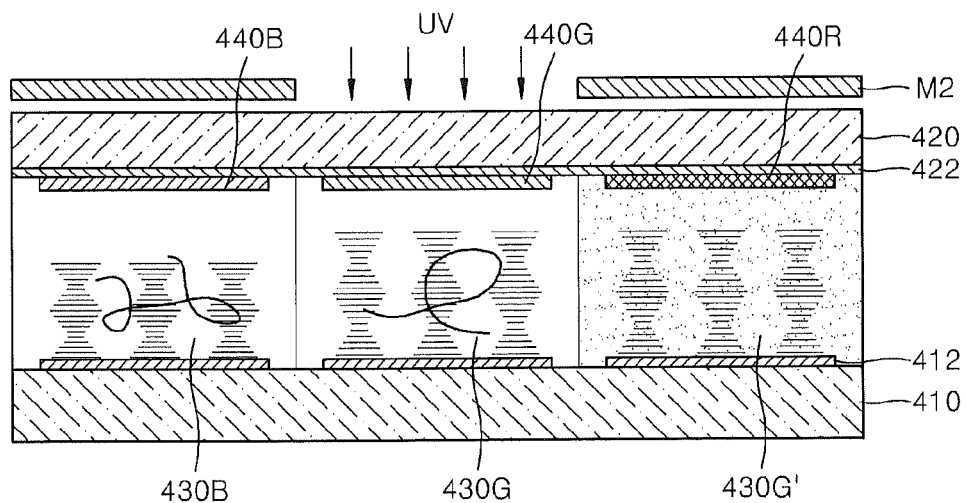
Figure 24:
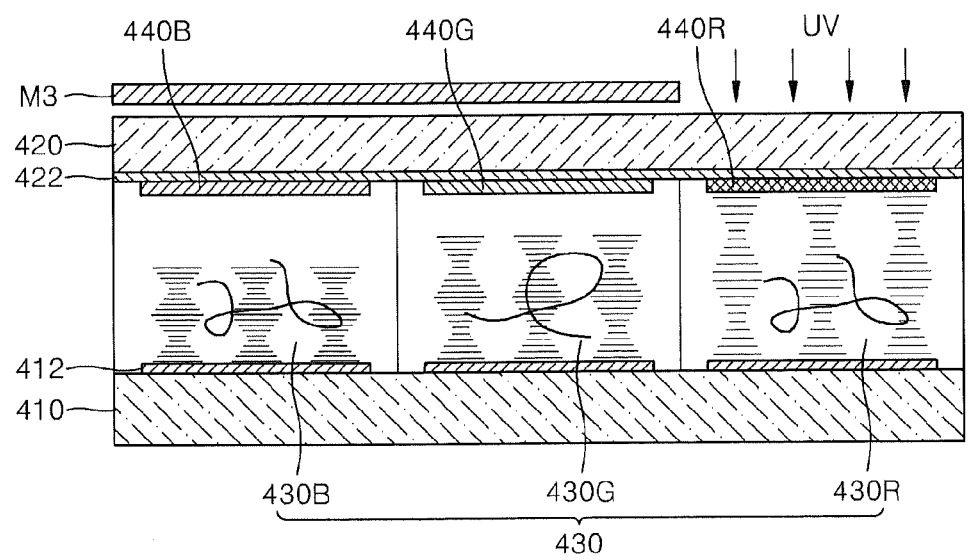

FIGS. 22 through 24 are views illustrating a method of manufacturing a cholesteric liquid crystal display device according to another example embodiment. The method of manufacturing the cholesteric liquid crystal display device shown in FIGS. 22 through 24 is similar to the method of manufacturing the cholesteric liquid crystal display device described with reference to FIGS. 11 through 18, except that red, green, and blue color filter layers 440R, 440G, and 440B are disposed on a lower surface of a second (upper) substrate 420.

Referring to FIG. 22, a first substrate 410 and the second substrate 420 are spaced apart from each other. A plurality of first electrodes 412 are formed on the upper surface of the first substrate 410. A plurality of second electrodes 422 are formed on the lower surface of the second substrate 420.

A red color filter layer 440R is formed to correspond to the red subpixel 450R on a lower surface of the second electrodes 422. A green color filter layer 440G is formed to correspond to the green subpixel 450G on a lower surface of the second substrate 420. A blue color filter layer 440B is formed to correspond to the blue subpixel 450B on a lower surface of the second electrodes 422.

Still referring to FIG. 22, a cholesteric liquid crystal composition (not shown) is injected between the first substrate 410 and the second substrate 420. The cholesteric liquid crystal composition includes a mixture of liquid crystal molecules, a chiral dopant, and an optically polymerizable polymer. A blue liquid crystal composition 430B' is formed by adjusting a temperature of the cholesteric liquid crystal composition and applying a given, desired or predetermined voltage to the cholesteric liquid crystal composition. By adjusting the temperature of the cholesteric liquid crystal composition to a given, desired or predetermined temperature and applying a given, desired or predetermined voltage to the cholesteric liquid crystal composition, the blue liquid crystal composition 430B' having the helix pitch of a blue light wavelength reflection band may be formed. As described above, a clearer blue color may be displayed by varying the temperature and applying a voltage concurrently or simultaneously.

Still referring to FIG. 22, a mask M1 is formed on portions of the upper surface of the second substrate 420 corresponding to the green subpixel 450G and the red subpixel 450R. The portion of the second substrate 220 corresponding to the blue subpixel 450G is exposed through the mask M1.

The blue liquid crystal composition 430B' disposed in a region corresponding to the blue subpixel 450B is cured with UV rays by irradiating at least the exposed portion of the second substrate 420 with UV rays. Thus, an optically polymerizable polymer included in the blue liquid crystal composition 430B' disposed in the region corresponding to the blue subpixel 450B is cured, thereby forming a blue liquid crystal layer 430B. By curing the blue liquid crystal composition 430B' with UV rays, the helix pitch having a blue light wavelength reflection band is fixed in the blue liquid crystal layer 430B.

Referring to FIG. 23, a green liquid crystal composition 430G' is formed by reducing a temperature of the uncured blue liquid crystal composition 430B' disposed in regions corresponding to the green subpixel 450G and the red subpixel 450R. By reducing the temperature of the uncured blue liquid crystal composition 430B', the green liquid crystal composition 430G' having the helix pitch of a green light wavelength reflection band is formed in the regions corresponding to the green subpixel 450G and the red subpixel 450R.

A mask M2 is formed on portions of the upper surface of the second substrate 420 corresponding to the blue subpixel 450B and the red subpixel 450R. The portion of the second substrate 420 corresponding to the green subpixel 450G is exposed through the mask M2.

The green liquid crystal composition 430G' disposed in the region corresponding to the green subpixel 450G is cured with UV rays by irradiating at least the exposed portion of the second substrate 420 with UV rays. Thus, an optically polymerizable polymer included in the green liquid crystal composition 430G' disposed in the region corresponding to the green subpixel 450G is cured to form a green liquid crystal layer 430G. By curing the green liquid crystal composition 430G' with UV rays, the helix pitch having a green light wavelength reflection band is fixed in the green liquid crystal layer 430G.

As described above, in alternative example embodiments, the green liquid crystal composition 430G' may be cured with UV rays using the second mask M2' (of FIG. 17) that exposes the blue and green subpixels 450B and 450G.

Referring to FIG. 24, a red liquid crystal composition (not shown) is formed by further reducing a temperature of the uncured green liquid crystal composition 430G' disposed in the region corresponding to the red subpixel 450R. By further reducing the temperature of the uncured green liquid crystal composition 430G', the helix pitch of a cholesteric phase increases. Thus, the red liquid crystal composition having the helix pitch of a red light wavelength reflection band may be formed in the region corresponding to the red subpixel 450R by reducing the temperature of the uncured green liquid crystal composition 430G'.

A mask M3 is formed on portions of the upper surface of the second substrate 420 corresponding to the blue subpixel 450B and the green subpixel 450G. The portion of the second substrate 420 corresponding to the red subpixel 450R is exposed through the mask M3.

The red liquid crystal composition disposed in the region corresponding to the red subpixel 450R is then cured with UV rays by irradiating the exposed portion of the second substrate 420 with UV rays. Thus, an optically polymerizable polymer included in the red liquid crystal composition disposed in the region corresponding to the red subpixel 450R is cured to form a red liquid crystal layer 430R. By curing the red liquid crystal composition with UV rays, the helix pitch having the red light wavelength reflection band is fixed in the red liquid crystal layer 430R.

As described above, the red liquid crystal composition may be cured by irradiating UV rays onto the upper portion of the second substrate 420 without a mask.

According to the example embodiments described above with regard to FIGS. 22-24, a cholesteric liquid crystal layer 430 including the red, green, and blue liquid crystal layers 430R, 430G, and 430B corresponding to the red, green, and blue subpixels 450R, 450G, and 450B is formed between the first substrate 410 and the second substrate 420. In this example, the liquid crystal layers are formed sequentially from shorter wavelength reflection bands to longer wavelength reflection bands according to a reduction in temperature. More specifically, the blue, green, and red liquid crystal layers 430B, 430G, and 430R are formed sequentially.

As described above, the red, green, and blue color filter layers 440R, 440G, and 440B are disposed on a lower surface of the second (upper) substrate 420, thereby displaying clearer color image having relatively high resolution and/or relatively high purity.

Although the voltage is applied to the blue liquid crystal layer 430B in this example embodiment, example embodiments are not limited thereto. For example, the voltage may be applied to the red liquid crystal layer 430R and/or the green liquid crystal layer 430G. Further, although a pixel unit includes the red, green, and blue subpixels 450R, 450G, and 450B in this example embodiment, the pixel unit may include cyan, magenta, and yellow subpixels in alternative example embodiments. In this case, the cholesteric liquid crystal layer 430 may include cyan, magenta, and yellow liquid crystal layers. In other example embodiments, the pixel unit may include various colors of subpixels.

Figure 25:
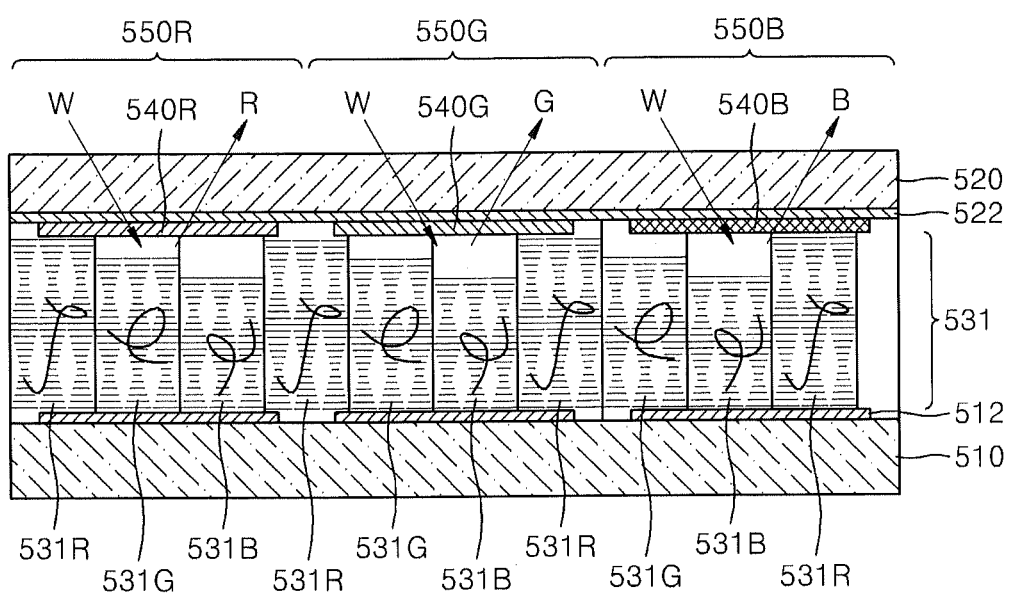
FIG. 25 is a cross-sectional view of a single-layer cholesteric liquid crystal display device according to another example embodiment.

FIG. 25 is a cross-sectional view of a single-layer cholesteric liquid crystal display device according to another example embodiment.

The single-layer cholesteric liquid crystal display device shown in FIG. 25 includes a plurality of pixel units, each of which includes red, green, and blue subpixels 550R, 550G, and 550B.

Referring to FIG. 25, a first (lower) substrate 510 and a second (upper) substrate 520 are spaced apart from one another. A plurality of first electrodes 512 are formed on an upper surface of the first substrate 510. A plurality of second electrodes 522 are formed on a lower surface of the second substrate 520. The first substrate 510 and the second substrate 520 may be formed of a transparent material such as glass, a plastic material or the like. The first electrodes 512 and the second electrodes 522 may be formed of a transparent conductive material such as ITO or the like.

If the single-layer cholesteric liquid crystal display device is an AM display device, the first electrodes 512 may be formed to correspond to the red, green, and blue subpixels 550R, 550G, and 550B, whereas the second electrodes 522 may be formed integrally as a common electrode. In this example, a TFT may be connected to each of the first electrodes 512.

Alternatively, if the single-layer cholesteric liquid crystal display device is a PM display device, the first electrodes 512 may be stripe-shaped and formed in parallel or substantially parallel with one another, whereas the second electrodes 522 may be parallel or substantially to one another across the first electrodes 512.

Still referring to FIG. 25, a red color filter layer 540R is formed on a lower surface of the second electrode 522 to correspond to the red subpixel 550R. A green color filter layer 540G is formed on a lower surface of the second electrode 522 to correspond to the green subpixel 550G. A blue color filter layer 540B is formed on a lower surface of the second electrode 522 to correspond to the blue subpixel 550B.

A cholesteric liquid crystal layer 531 is formed between the first substrate 510 and the second substrate 520. The cholesteric liquid crystal layer 531 includes a plurality of red, green, and blue micro-liquid crystal layers 531R, 531G, and 531B that are randomly arranged between the first substrate 510 and the second substrate 520. In this regard, the cholesteric liquid crystal layer 531 may include a plurality of micro-liquid crystal layers (e.g., red, green, and blue micro-liquid crystal layers 531R, 531G, and 531B) corresponding to each of the red subpixel 550R, the green subpixel 550G, and the blue subpixel 550B. Each of the red, green, and blue micro-liquid crystal layers 531R, 531G, and 531B includes: liquid crystal molecules; a chiral dopant, which is mixed with the liquid crystal molecules to form a cholesteric phase; and an optically polymerizable polymer that is cured to fix a helix pitch of the cholesteric phase. As described above, the red, green, and blue micro-liquid crystal layers 531R, 531G, and 531B are determined according to the helix pitch.

The red micro-liquid crystal layer 531R selectively reflects red light R, the green micro-liquid crystal layer 531G selectively reflects green light G, and the blue liquid crystal layer 531B selectively reflects blue light B. If the red light R, the green light G, and the blue light B are reflected from the red, green, and blue micro-liquid crystal layers 531R, 531G, and 531B corresponding to the red, green, and blue subpixels 550R, 550G, and 550B, respectively, the red, green, and blue subpixels 550R, 550G, and 550B emit white light W.

In the example embodiment shown in FIG. 25, a color filter layer (e.g., the red color filter layer 540R) of a given, desired or predetermined color corresponding to a subpixel (e.g., the red subpixel 550R) is formed in upper portions of the red, green, and blue micro-liquid crystal layers 531R, 531G, and 531B. As a result, light (e.g., the red light R) of a color corresponding to the color filter layer (e.g., the red color filter layer 540R) is emitted from the subpixel (e.g., the red subpixel 550R).

If a voltage is applied between the first electrodes 512 and the second electrodes 522 of a subpixel (e.g., the red subpixel 550R) and liquid crystal molecules are arranged in parallel with each other in an electric field, the incident light passes through the cholesteric liquid crystal layer 531 and the subpixel (e.g., the red subpixel 550R) displays a black color. Based on the same or substantially the same principle as described above, a color image may be realized by selectively applying a voltage to the first electrodes 512 and the second electrodes 522 of the red, green, and blue subpixels 550R, 550G, and 550B.

Although not shown, a spacer may be further disposed between the first substrate 510 and the second substrate 520 to maintain a constant or substantially constant gap between the first substrate 510 and the second substrate 520. A light absorption layer (not shown) may be further disposed on the first substrate 510. The light absorption layer absorbs light that passes through the cholesteric liquid crystal layer 531, thereby increasing color purity.

Although each of the pixel units includes the red, green, and blue subpixels 550R, 550G, and 550B in this example embodiment, example embodiments are not limited thereto. For example, each pixel unit may include cyan, magenta, and yellow subpixels. In other alternative embodiments, the pixel units may include various colors of subpixels.

An example embodiment of a method of manufacturing the single-layer cholesteric liquid crystal display device of FIG. 25 will now be described. The method of manufacturing the single-layer cholesteric liquid crystal display device of FIG. 25 is similar to the method of manufacturing the cholesteric liquid crystal display device described with reference to FIGS. 19 through 24, except that a plurality of micro-liquid crystal layers are disposed to correspond to each sub-pixel.

An example embodiment of a method of sequentially forming the micro-liquid crystal layers from longer wavelength reflection bands to shorter wavelength reflection bands by sequentially increasing a temperature of a liquid crystal composition will now be described.

The first substrate 510 and the second substrate 520 are spaced apart from one another. A plurality of first electrodes 512 are formed on the upper surface of the first substrate 510. A plurality of second electrodes 522 are formed on the lower surface of the second substrate 520. The red, green, and blue color filter layers 540R, 540G, and 540B are disposed on the lower surface of the second electrodes 522 to correspond to the red, green, and blue subpixels 550R, 550G, and 550B, respectively.

A cholesteric liquid crystal composition is then injected between the first substrate 510 and the second substrate 520. The cholesteric liquid crystal composition is a mixture of liquid crystal molecules, a chiral dopant, and an optically polymerizable polymer.

A red liquid crystal composition is formed by adjusting a temperature of the cholesteric liquid crystal composition. A first mask is formed on an upper surface of the second substrate 520. The first mask has a random pattern such that random portions of the upper surface of the second substrate 520 are exposed. The red liquid crystal composition is then cured with UV rays by irradiating UV rays toward the upper surface of the second substrate 520. Thus, the red micro-liquid crystal layers 531R are randomly formed in the red liquid crystal composition by curing an optically polymerizable polymer.

Thereafter, a green liquid crystal composition is formed by increasing a temperature of the uncured red liquid crystal composition. A second mask is then formed on an upper surface of the second substrate 520. The second mask has another random pattern such that different random portions of the upper surface of the second substrate 520 are exposed. The green liquid crystal composition is cured with UV rays by irradiating UV rays toward the upper surface of the second substrate 520. In alternative example embodiments, the green liquid crystal composition may be cured by moving the first mask and irradiating UV rays toward an upper surface of the second substrate 520. Thus, the green micro-liquid crystal layers 531G are randomly formed in the green liquid crystal composition by curing the optically polymerizable polymer.

A blue liquid crystal composition is then formed by increasing a temperature of the uncured green liquid crystal composition.

A third mask is then formed on an upper surface of the second substrate 520. The third mask has a random pattern such that different random portions of the upper surface of the second substrate 520 are exposed. The blue liquid crystal composition is cured with UV rays by irradiating UV rays toward an upper surface of the second substrate 520. Thus, the blue micro-liquid crystal layers 531B are randomly formed in the blue liquid crystal composition by curing the optically polymerizable polymer. In alternative example embodiments, the blue liquid crystal composition may be cured with UV rays by moving the first mask and irradiating UV rays toward the upper surface of the second substrate 520.

According to the above-described method, the cholesteric liquid crystal layer 531 including the red, green, and blue micro-liquid crystal layers 531R, 531G, and 531B corresponding to the red, green, and blue subpixels 550R, 550G, and 550B, respectively, is formed between the first substrate 510 and the second substrate 520.

Although the red, green, and blue micro-liquid crystal layers 531R, 531G, and 531B are described as being formed by increasing the temperature, at least one of the red, green, and blue micro-liquid crystal layers 531R, 531G, and 531B may be formed by applying a voltage thereto in addition to the increase in the temperature as described above.

An example embodiment of a method of sequentially forming the micro-liquid crystal layers from shorter wavelength reflection bands to longer wavelength reflection bands by sequentially reducing a temperature of a liquid crystal composition will now be described.

The first substrate 510 and the second substrate 520 are spaced apart from each other. The first electrodes 512 are formed on the upper surface of the first substrate 510. The second electrodes 522 are formed on the lower surface of the second substrate 520. The red, green, and blue color filter layers 540R, 540G, and 540B corresponding to the red, green, and blue subpixels 550R, 550G, and 550B are disposed on the lower surface of the second substrate 520.

A cholesteric liquid crystal composition is then injected between the first substrate 510 and the second substrate 520. The cholesteric liquid crystal composition is a mixture of liquid crystal molecules, a chiral dopant, and an optically polymerizable polymer.

A blue liquid crystal composition is formed by adjusting a temperature of the cholesteric liquid crystal composition.

A first mask is then formed on an upper surface of the second substrate 520. The first mask has a random pattern such that random portions of the upper surface of the second substrate 520 are exposed. The blue liquid crystal composition is then cured with UV rays by irradiating UV rays toward an upper surface of the second substrate 520. Thus, the blue micro-liquid crystal layers 531B are randomly formed in the blue liquid crystal composition by curing an optically polymerizable polymer.

Thereafter, a green liquid crystal composition is formed by reducing a temperature of the uncured blue liquid crystal composition.

A second mask is then formed on an upper surface of the second substrate 520. The second mask has another random pattern such that different random portions of the upper surface of the second substrate 520 are exposed. The green liquid crystal composition is then cured with UV rays by irradiating UV rays toward an upper surface of the second substrate 520. Thus, the green micro-liquid crystal layers 531G are randomly formed in the green liquid crystal composition by curing the optically polymerizable polymer.

In an alternative example embodiment, the green liquid crystal composition may be cured with UV rays by moving the first mask and irradiating UV rays toward an upper surface of the second substrate 520.

Thereafter, a red liquid crystal composition is formed by reducing a temperature of the uncured green liquid crystal composition.

A third mask is then formed on an upper surface of the second substrate 520. The third mask has another random pattern such that different random portions of the upper surface of the second substrate 520 are exposed. The red liquid crystal composition is cured with UV rays by irradiating UV rays toward an upper surface of the second substrate 520. Thus, the red micro-liquid crystal layers 531R are randomly formed in the red liquid crystal composition by curing the optically polymerizable polymer.

In an alternative example embodiment, the red liquid crystal composition may be cured by moving the first mask and irradiating UV rays toward an upper surface of the second substrate 520.

According to the above-described method, the cholesteric liquid crystal layer 531 including the red, green, and blue micro-liquid crystal layers 531R, 531G, and 531B corresponding to the red, green, and blue subpixels 550R, 550G, and 550B, respectively, is formed between the first substrate 510 and the second substrate 520.

Although the red, green, and blue micro-liquid crystal layers 531R, 531G, and 531B are discussed as being formed by reducing the temperature, at least one of the red, green, and blue micro-liquid crystal layers 531R, 531G, and 531B may be formed by applying a voltage thereto, in addition to reducing the temperature as described.

According to example embodiments described herein, a cholesteric liquid crystal display device may be manufactured as a single-layer cholesteric liquid crystal display device, thereby realizing a display device having a relatively simple structure, while suppressing deterioration of optical characteristics. Further, a reduction in manufacturing costs and/or simplification of process may enable mass production of the cholesteric liquid crystal display device, and a color image of relatively high resolution and/or relatively high purity may be realized.

It should be understood that the example embodiments described therein should be considered in a descriptive sense only and not for purposes of limitation. Descriptions of features or aspects within each embodiment should typically be considered as available for other similar features or aspects in other embodiments.

What is claimed is:

1. A pixel unit of a cholesteric liquid crystal display device, the pixel unit having a plurality of subpixels and comprising:
    a first substrate and a second substrate spaced apart from each other;
    a plurality of color filter layers formed on the second substrate, each of the plurality of color filter layers corresponding to a different color and corresponding to one of the plurality of subpixels; and
    a cholesteric phase liquid crystal layer disposed between the first substrate and the second substrate; wherein
        the cholesteric phase liquid crystal layer includes a plurality of different color micro-liquid crystal layers corresponding to each of the plurality of subpixels.

2. The cholesteric liquid crystal display of claim 1, wherein the plurality of color filter layers include red, green, and blue color filter layers, and the plurality of different color micro-liquid crystal layers include red, green, and blue micro-liquid crystal layers.

3. The cholesteric liquid crystal display of claim 1, wherein the plurality of color filter layers include cyan, magenta, and yellow color filter layers, and the plurality of different color micro-liquid crystal layers include cyan, magenta, and yellow micro-liquid crystal layers.

4. The cholesteric liquid crystal display of claim 1, further comprising:
    a plurality of first electrodes formed on the first substrate; and
    a plurality of second electrodes formed on the second substrate.

5. The cholesteric liquid crystal display of claim 4, wherein the plurality of first electrodes are formed to correspond to the plurality of subpixels, and the plurality of second electrodes are formed as a common electrode.

6. The cholesteric liquid crystal display of claim 4, wherein the plurality of first electrodes and the plurality of second electrodes are stripe-shaped and cross each other.

7. A method of manufacturing the pixel unit of claim 1, the method comprising:
    forming a cholesteric phase liquid crystal composition between the first substrate and the second substrate; and
    forming the plurality of liquid crystal layers between the first substrate and the second substrate by sequentially adjusting a temperature of the cholesteric phase liquid crystal composition and performing a plurality of optical curing processes on the cholesteric phase liquid crystal composition, each of the plurality of liquid crystal layers corresponding to one of the plurality of subpixels; wherein
        a voltage is applied to the cholesteric phase liquid crystal composition when forming at least one of the plurality of liquid crystal layers.

8. The method of claim 7, wherein the cholesteric phase liquid crystal composition includes liquid crystal molecules, an optically polymerizable polymer and a chiral dopant.

9. The method of claim 7, wherein each of the plurality of liquid crystal layers is formed by adjusting a pitch of the cholesteric phase liquid crystal composition, the pitch of the cholesteric phase liquid crystal composition being adjusted by at least one of varying the temperature of the cholesteric phase liquid crystal composition and applying the voltage to the cholesteric phase liquid crystal composition.

10. The method of claim 7, wherein the voltage is applied to the cholesteric phase liquid crystal composition when forming the liquid crystal layer having a shortest wavelength reflection band.

11. The method of claim 7, wherein the sequentially adjusting the temperature of the cholesteric phase liquid crystal composition comprises:
    sequentially increasing the temperature of the cholesteric phase liquid crystal composition such that the plurality of liquid crystal layers are sequentially formed according to decreasing wavelength reflection bands.

12. The method of claim 7, wherein the sequentially adjusting the temperature of the cholesteric phase liquid crystal composition comprises:
    sequentially decreasing the temperature of the cholesteric phase liquid crystal composition such that the plurality of liquid crystal layers are sequentially formed according to increasing wavelength reflection bands.

13. The method of claim 7, wherein the plurality of liquid crystal layers include red, green, and blue liquid crystal layers.

14. The method of claim 7, wherein the plurality of liquid crystal layers include cyan, magenta, and yellow liquid crystal layers.

15. The method of claim 7, further comprising:
    forming a plurality of first electrodes on the first substrate; and
    forming a plurality of second electrodes on the second substrate.

16. The method of claim 15, wherein the plurality of first electrodes are formed to correspond to the plurality of liquid crystal layers, and the plurality of second electrodes are integrally formed as a common electrode.

17. The method of claim 15, wherein the plurality of first electrodes and the plurality of second electrodes are stripe-shaped and cross each other.

18. The method of claim 7, further comprising:
    forming a color filter layer corresponding to each of the plurality of subpixels on the second substrate; wherein
        each color filter layer corresponds to a different color.

19. The method of claim 18, wherein the cholesteric phase liquid crystal composition includes liquid crystal molecules, an optically polymerizable polymer, and a chiral dopant.

20. The method of claim 18, wherein the voltage is applied to the cholesteric phase liquid crystal composition when forming the liquid crystal layer having a shortest wavelength reflection band.

21. The method of claim 18, wherein the sequentially adjusting the temperature of the cholesteric phase liquid crystal composition comprises:
sequentially increasing the temperature of the cholesteric phase liquid crystal composition such that the plurality of liquid crystal layers are sequentially formed according to decreasing wavelength reflection bands.

22. The method of claim 18, wherein the sequentially adjusting the temperature of the cholesteric phase liquid crystal composition comprises:
sequentially decreasing the temperature of the cholesteric phase liquid crystal composition such that the plurality of liquid crystal layers are sequentially formed according to increasing wavelength reflection bands.

23. The method of claim 18, wherein the plurality of liquid crystal layers include red, green, and blue liquid crystal layers.

24. The method of claim 18, wherein the plurality of liquid crystal layers include cyan, magenta, and yellow liquid crystal layers.

25. The method of claim 18, further comprising:
forming a plurality of first electrodes on the first substrate; and
forming a plurality of second electrodes on the second substrate.

26. A method of manufacturing a pixel unit of a cholesteric liquid crystal display device, the pixel unit including a plurality of subpixels, the method comprising:
preparing a first and a second substrate;
forming a plurality of different color filter layers on the second substrate, each different color filter layer corresponding to one of the plurality of subpixels;
forming a cholesteric phase liquid crystal composition between the first substrate and the second substrate; and
forming a plurality of different color micro-liquid crystal layers corresponding to each of the plurality of subpixels by sequentially adjusting a temperature of the cholesteric phase liquid crystal composition and sequentially performing a plurality of optical curing processes.

27. The method of claim 26, wherein a voltage is applied to the cholesteric phase liquid crystal composition when forming at least one of the plurality of micro-liquid crystal layers.

28. The method of claim 26, wherein the cholesteric phase liquid crystal composition includes liquid crystal molecules, an optically polymerizable polymer, and a chiral dopant.

29. The method of claim 26, wherein the sequentially adjusting the temperature of the cholesteric phase liquid crystal composition comprises:
sequentially increasing the temperature of the cholesteric phase liquid crystal composition such that the plurality of micro-liquid crystal layers are sequentially formed according to decreasing wavelength reflection bands.

30. The method of claim 26, wherein the sequentially adjusting the temperature of the cholesteric phase liquid crystal composition comprises:
sequentially decreasing the temperature of the cholesteric phase liquid crystal composition such that the plurality of micro-liquid crystal layers are sequentially formed according to increasing wavelength reflection bands.

31. The method of claim 26, wherein the plurality of color filter layers include red, green, and blue color filter layers, and the plurality of micro-liquid crystal layers include red, green, and blue micro-liquid crystal layers.

32. The method of claim 26, wherein the plurality of color filter layers include cyan, magenta, and yellow color filter layers, and the plurality of micro-liquid crystal layers include cyan, magenta, and yellow micro-liquid crystal layers.

33. The method of claim 26, further comprising:
forming a plurality of first electrodes on the first substrate; and
forming a plurality of second electrodes on the second substrate.

* * * * *